United States Patent
Kline et al.

(10) Patent No.: US 10,169,765 B2
(45) Date of Patent: Jan. 1, 2019

(54) METHOD AND APPARATUS FOR GENERATING ADVERTISEMENT INFORMATION FOR PERFORMING A MARKETING CAMPAIGN

(75) Inventors: Michael L. Kline, Bell Canyon, CA (US); Robert Kendrick Spitz, Amherst, NH (US); Leon Frederick Simmonds, Jr., North Hills, CA (US); Jonathan Daniel Myron, Woodland Hills, CA (US); Thomas Richard Hubbard, San Ramon, CA (US)

(73) Assignee: REACHLOCAL, INC., Encino, CA (US)

( * ) Notice: Subject to any disclaimer, the term of this patent is extended or adjusted under 35 U.S.C. 154(b) by 2528 days.

(21) Appl. No.: 10/956,557

(22) Filed: Oct. 1, 2004

(65) Prior Publication Data

US 2006/0074748 A1    Apr. 6, 2006

(51) Int. Cl.
*G06Q 30/00*        (2012.01)
*G06Q 30/02*        (2012.01)

(52) U.S. Cl.
CPC ......... *G06Q 30/02* (2013.01); *G06Q 30/0249* (2013.01); *G06Q 30/0253* (2013.01);
(Continued)

(58) Field of Classification Search
USPC ........................................................ 705/14
See application file for complete search history.

(56) References Cited

U.S. PATENT DOCUMENTS 5,724,521 A    3/1998 Dedrick
5,812,769 A    9/1998 Graber et al.
(Continued)

FOREIGN PATENT DOCUMENTS

JP    20010344145        12/2001
JP    2002049553 A1    2/2002
(Continued)

OTHER PUBLICATIONS

Consumption Markets Culture, vol. 4, No. 1; A. Fuat Firat and Alladi Venkatesh ed., Hardwood Academic Publishers, publ., (2000).
(Continued)

*Primary Examiner* — Yehdega Retta
(74) *Attorney, Agent, or Firm* — Cantor Colburn LLP

(57) ABSTRACT

Disclosed are methods and apparatus, including computer program products, implementing and using techniques for generating advertisement information for performing a marketing campaign on behalf of an advertiser. The advertiser has an associated computer in communication with a data network. A plurality of electronic publishers in communication with the data network are used. In one aspect, the method includes receiving, over the data network, information describing subject matter of the marketing campaign. Advertisement information is generated based on the received information describing the marketing campaign subject matter. A plurality of instantiations of the advertisement information are generated using publisher parameters associated with the electronic publishers. Each instantiation is in a format appropriate for a respective one of the electronic publishers. At least one of the generated instantiations is provided to the respective electronic publisher over the data network.

54 Claims, 17 Drawing Sheets

(52) U.S. Cl.
CPC ..... *G06Q 30/0269* (2013.01); *G06Q 30/0272* (2013.01); *G06Q 30/0275* (2013.01)

(56) References Cited

U.S. PATENT DOCUMENTS

| | | |
|---|---|---|
| 5,933,811 A | 8/1999 | Angles et al. |
| 5,960,409 A | 9/1999 | Wexler |
| 6,009,410 A | 12/1999 | LeMole et al. |
| 6,230,199 B1 | 5/2001 | Revashetti et al. |
| 6,286,005 B1 | 9/2001 | Cannon |
| 6,317,761 B1 | 11/2001 | Landsman et al. |
| 6,332,127 B1 | 12/2001 | Bandera et al. |
| 6,385,592 B1 | 5/2002 | Angles et al. |
| 6,397,246 B1 | 5/2002 | Wolfe |
| 6,401,075 B1 | 6/2002 | Mason et al. |
| 6,470,079 B1 | 10/2002 | Benson |
| 6,487,538 B1 | 11/2002 | Gupta et al. |
| 6,611,862 B2 | 8/2003 | Reisman |
| 6,785,659 B1 | 8/2004 | Landsman et al. |
| 6,804,660 B2 | 10/2004 | Landau et al. |
| 6,847,992 B1 | 1/2005 | Haitsuka et al. |
| 6,877,007 B1 | 4/2005 | Hentzel et al. |
| 6,895,387 B1 | 5/2005 | Roberts et al. |
| 6,898,571 B1 | 5/2005 | Val et al. |
| 6,912,571 B1 | 6/2005 | Serena |
| 6,938,077 B2 | 8/2005 | Sanders |
| 6,973,436 B1 | 12/2005 | Shkedi ............................ 705/14 |
| 6,985,882 B1 | 1/2006 | Del Sesto ....................... 705/37 |
| 7,010,497 B1 | 3/2006 | Nyhan et al. |
| 7,028,071 B1 | 4/2006 | Slik |
| 7,028,072 B1 | 4/2006 | Kliger et al. |
| 7,031,932 B1 | 4/2006 | Lipsky et al. |
| 7,039,599 B2 | 5/2006 | Merriman et al. |
| 7,072,947 B1 | 7/2006 | Knox et al. |
| 7,103,564 B1 | 9/2006 | Ehnebuske et al. |
| 7,120,235 B2 | 10/2006 | Altberg et al. |
| 7,251,616 B1 | 7/2007 | Perttunen |
| 7,284,008 B2 | 10/2007 | Henkin et al. |
| 7,313,622 B2 | 12/2007 | Lee et al. |
| 7,328,435 B2 | 2/2008 | Trifon |
| 7,464,381 B1 | 12/2008 | Nickerson et al. |
| 7,818,435 B1 | 10/2010 | Jellinek |
| 2001/0032126 A1 | 10/2001 | Macartney-Filgate et al. |
| 2002/0004733 A1 | 1/2002 | Addante |
| 2002/0010757 A1 | 1/2002 | Granik et al. |
| 2002/0019768 A1 | 2/2002 | Fredrickson et al. |
| 2002/0029290 A1 | 3/2002 | Burema et al. |
| 2002/0032603 A1 | 3/2002 | Yeiser |
| 2002/0046281 A1 | 4/2002 | Cope |
| 2002/0082914 A1 | 6/2002 | Beyda et al. |
| 2002/0087679 A1 | 7/2002 | Pulley et al. |
| 2002/0091565 A1 | 7/2002 | Lee |
| 2002/0103712 A1 | 8/2002 | Rollins et al. |
| 2002/0120503 A1 | 8/2002 | Iwayama et al. |
| 2002/0129094 A1 | 9/2002 | Reisman |
| 2003/0088463 A1 | 5/2003 | Kanevsky et al. |
| 2003/0110080 A1 | 6/2003 | Tsutani et al. |
| 2003/0171990 A1 | 9/2003 | Rao et al. |
| 2004/0030594 A1 | 2/2004 | Berczik |
| 2004/0030597 A1 | 2/2004 | Bibas |
| 2004/0054589 A1 | 3/2004 | Nicholas et al. |
| 2004/0059632 A1 | 3/2004 | Kang et al. |
| 2004/0102197 A1 | 5/2004 | Dietz |
| 2004/0225566 A1 | 11/2004 | Beyda et al. |
| 2004/0260767 A1 | 12/2004 | Kedem et al. |
| 2005/0021395 A1 | 1/2005 | Luu |
| 2005/0021440 A1* | 1/2005 | Dresden ......................... 705/37 |
| 2005/0144069 A1 | 6/2005 | Wiseman et al. |
| 2005/0144315 A1 | 6/2005 | George et al. |
| 2005/0182676 A1 | 8/2005 | Chan ............................... 705/14 |
| 2005/0235044 A1 | 10/2005 | Tazuma |
| 2005/0256766 A1 | 11/2005 | Garcia et al. |
| 2005/0256768 A1 | 11/2005 | Robinson |
| 2006/0015406 A1 | 1/2006 | Beyda et al. |
| 2006/0026067 A1 | 2/2006 | Nicholas et al. |
| 2006/0031404 A1 | 2/2006 | Kassab |
| 2006/0046281 A1 | 3/2006 | Smith et al. |
| 2006/0271671 A1 | 11/2006 | Hansen |
| 2007/0073581 A1 | 3/2007 | Kempe et al. |
| 2007/0136136 A1 | 6/2007 | Nossik |
| 2007/0143283 A1 | 6/2007 | Spencer et al. |
| 2007/0168506 A1 | 7/2007 | Douglas et al. |
| 2007/0198346 A1 | 8/2007 | Beyda et al. |

FOREIGN PATENT DOCUMENTS

| | | |
|---|---|---|
| JP | 2002163172 | 6/2002 |
| JP | 2002278865 | 9/2002 |
| JP | 2003296503 A1 | 10/2003 |
| JP | 2004178314 | 6/2004 |
| JP | 2005267015 | 9/2005 |
| JP | 2006018795 | 1/2006 |
| JP | 2006502496 | 1/2006 |
| WO | WO9962011 | 12/1999 |
| WO | WO0104784 | 1/2001 |
| WO | WO0139024 | 5/2001 |
| WO | WO0242937 | 5/2002 |
| WO | WO03025696 | 3/2003 |
| WO | WO2006031402 | 3/2006 |

OTHER PUBLICATIONS

Colby, David E. "E-Marketing: Advertise Your Web Site", University of Wisconsin (2003).

International Search Report and Written Opinion dated Apr. 14, 2008 for application No. PCT/US07/07752.

Manchanda, P., J.-P. Dube K.Y. Goh and P.K. Chintagunta, "The Effects of Banner Advertising on Consumer Inter-Purchase Time and Expenditures in Digital Environment", University of Chicago, (Version Jun. 2002).

International Search Report and Written Opinion dated Dec. 26, 2006 for International application No. PCT/US05/34878.

Examination Report for Patent Application No. 571618 dated Mar. 9, 2010.

Examination Report for Patent Application No. 554227 dated May 21, 2009, 2 pages.

New Zealand Patent Application No. 595120 Examination Report dated Sep. 14, 2011, 2 pgs.

First Examiner's Report dated Jan. 4, 2012, Canadian Patent Application No. 2,620,059, 3 pages.

Examination Report for Patent Application No. 554227 dated Dec. 8, 2010, 3 pages.

Extended European Search Report for PCT/US2005034878 dated Feb. 2, 2010.

McElrath, FilterProxy Home Page, FilterProxy, Jan. 13, 2002, filterproxy.sourceforge.net.

Examination Report for EP Application No. 07754295.9 dated Feb. 20, 2012, 5 pages.

Office Action and translation of objections for MX Patent Application No. MX/a/2008/012434 dated Feb. 13, 2012, 9 pages.

Translation of Rejection Notice for JP Application No. 2009-502991, dated Mar. 12, 2012, 2 pages.

First Examination Report dated Apr. 1, 2011 for Australian Patent Application No. 2007245044, 2 pages.

First Office Action dated Mar. 16, 2011 for China Application No. 200780015531.6, 11 pages.

European Search Report for European Patent Application No. 07754295.9 dated Apr. 27, 2011, 6 pages.

Japanese Application No. 2007-534736 English Translation of Office Action dated May 31, 2011, 4 pages.

First Examination Report dated Mar. 25, 2011 for New Zealand Patent Application No. 591806, 3 pages.

Second Office Action dated Mar. 22, 2012 for China Application No. 200780015531.6, 6 pages.

China Application No. 200780015531.6 Fifth Office Action dated Oct. 30, 2014, 5 pages.

New Zealand Application No. 631748 First Examination Report dated Oct. 1, 2014, 3 pages.

(56) References Cited

OTHER PUBLICATIONS

NZ Application No. 608089, First Examination Report dated Mar. 13, 2013, 2 pages.
Canadian Application No. 2,620,059, Second Examiner's Report dated Jun. 3, 2013, 4 pages.
R. Oppliger, "Privacy Protection and Anonymity Services for the World Wide Web (WWW)," Mar. 1999 (Mar. 1999), pp. 379-391.
Australian Patent Application No. 2005292067 Examiner's First Report dated Apr. 28, 2010, 3 pages.
Australian Patent Application No. 2012200506 Examination Report No. 1 dated Jul. 5, 2012, 4 pages.
China Patent Application No. 200780015531.6, English Version of Amended Claims RE: First Office Action filed Sep. 29, 2011, 8 pages.
China Patent Application No. 200780015531.6, English Version of Amended Claims RE: Second Office Action filed Aug. 6, 2012, 8 pages.
New Zealand Patent Application No. 602508, Examination Report dated Sep. 24, 2012, 3 pages.
Japanese Application No. 2007-534736, Claim Amendments filed Nov. 30, 2011, 4 pages.
JP Patent Application No. 2007-534736, Decision of Rejection dated Jun. 5, 2012, 4 pages.
R. Engelschall, "Load Distribution Technique for Website," UNIX Magazine, vol. 13, No. 9, ASCII Corporation, Japan, Sep. 1, 1998, 4 pages.
Australian Patent Application Nol 2012200506 Notice of Acceptance dated Sep. 26, 2012, 3 pages.
Canadian Application No. 2,647,821 Examiner's Report dated Jan. 15, 2014, 2 pages.
Canadian Application No. 2,647,821 Office Action, dated May 8, 2015, 4 pages.
China Application No. 200780015531.6 Decision on Rejection dated Jan. 6, 2014, 7 pages.
China Application No. 200780015531.6 Fourth Office Action dated Jul. 3, 2013, 8 pages.
EP Application No. 07754295.9 Examination Report dtd Jan. 28, 2014, 4 pages.
JP Patent Application No. 2007534736 Appeal Decision dated Jul. 23, 2013, 1 page.
JP Patent Application No. 2009502991 Certificate of Patent dated Mar. 8, 2013, with English Translation of Claims, 8 pages.
Korean Patent Application No. 10-2008-7026252 Translation of Second Office Action dated Sep. 5, 2013, 4 pages.
New Zealand Patent Application No. 622575, First Examination Report dated Mar. 20, 2014, 3 pages.

\* cited by examiner

| KEYWORD NAME | KEYWORD GROUP ID |
|---|---|
| | |

*FIG. 8A*

| CATEGORY | GEOGRAPHY | PUBLISHER ID | KEYWORD GROUP ID | KEYWORD GROUP BID AMOUNT | CAMPAIGN BUDGET | NUMBER OF BIDDERS | CURRENT MAX BID |
|---|---|---|---|---|---|---|---|
| | | | | | | | |

*FIG. 8B*

METHOD AND APPARATUS FOR GENERATING ADVERTISEMENT INFORMATION FOR PERFORMING A MARKETING CAMPAIGN

CROSS-REFERENCE TO RELATED APPLICATIONS

The present application relates to commonly assigned, copending U.S. patent application Ser. No. 10/956,554, filed concurrently herewith, for METHOD AND APPARATUS FOR PERFORMING A MARKETING CAMPAIGN ON BEHALF OF AN ADVERTISER, U.S. patwnt application Ser. No. 10/956,558, filed concurrently herewith, for METHOD AND APPARATUS FOR ALLOCATING A CAMPAIGN BUDGET AMONG PUBLISHERS FOR A MARKETING CAMPAIGN, U.S. patent application Ser. No. 10/956,553, filed concurrently herewith, for METHOD AND APPARATUS FOR TRACKING AND REPORTING CAMPAIGN STATUS INFORMATION FOR A MARKETING CAMPAIGN, and U.S. patent application Ser. No. 10/956,824, filed concurrently herewith, for METHOD AND APPARATUS FOR DYNAMICALLY RENDERING AN ADVERTISER WEB PAGE AS A PROXIED WEB PAGE. The disclosures of the above-listed applications are all incorporated herein by reference in their entirety for all purposes.

FIELD

The present invention generally relates to marketing campaigns. More particularly, the present invention relates to implementing and managing marketing campaigns among a plurality of publishers.

BACKGROUND

Before the widespread use of data networks such as the Internet, businesses reached potential customers using conventional advertising techniques: printed advertisements in newspapers and magazines, direct mailings, television commercials, radio commercials, yellow pages advertisements, sponsorships, etc. These conventional advertising techniques were "offline" in nature, that is, distributed through traditional media, that is, communications channels other than data networks such as the Internet. For most merchants, these offline advertising techniques were also local in nature. The advertisements were distributed within a limited local geographic area, typically on a town, city or county level. A dentist reached patients by purchasing an ad in the yellow pages. A used car dealer reached customers using a television commercial, an ad in the Sunday paper, and sponsorship of a local athletic team.

With the advent of the Internet, many businesses have achieved success on a national and international level. These businesses have focused their marketing to reach customers on the Internet. "Dot-com merchants" purchase banners and other advertisements for display by search engines and other web sites. The advertisement is displayed on a customer's or other user's personal computer when the user accesses the web site or runs a search on the search engine using keywords associated with the advertiser. National and international merchants, particularly those selling products by mail order, have benefited greatly from Internet advertising, which has essentially removed the geographic constraints associated with conventional advertising. Regardless of the user's physical location, the user can access Amazon.com over the World Wide Web ("web"), and purchase a book or DVD.

While the Internet has taken advertising to a global level, it is estimated that a large percentage of merchant searches performed on the Internet are still primarily local in nature. Local consumers are still looking for local merchants.

Many local businesses have not yet established any online presence. Local businesses have simply continued with the offline advertising techniques described above. Many local businesses believe it is simply not worth the time and cost to learn about internet advertising, decide on the appropriate publishers, e.g., search engines, online directories, other advertising web pages, and then figure out how to advertise on those sites. Most local merchants are unclear as to which keywords to use, how much to spend on each keyword, etc. Also, most local merchants do not have the time or means to decide how to allocate a budget for the different publishers and different types of advertisements. In addition, local merchants are unsure as to how to target online advertisements to a specific geographic area. The owner of a bowling alley in Los Angeles, Calif. is not interested in paying for advertisements to be displayed on the computer screen of a computer user located in Portland, Me. Further, local merchants are unable to track new customers reached and acquired through online advertisements. At the end of the day, most local merchants decide it is not worth the trouble to engage in online advertising.

By foregoing Internet advertising, many local merchants cannot reach an increasing number of local customers who have moved online. These local customers have taken to using the Internet during leisure time, and as a matter of course in their lives. Nowadays, many local customers looking for a car dealer, dentist, lawyer, hair salon, handyman, restaurant, exercise club, or other local merchant, will start their search on the Internet. The Internet has become so integrated with our daily lives, that many potential customers begin a search for essentially anything by accessing an online directory or an Internet search engine and entering the appropriate keywords. Local businesses and merchants who fail to establish an online presence and conduct online advertising, or fail to do so in an effective manner, will fail to reach these potential customers.

SUMMARY

Aspects of the present invention relate to methods and apparatus, including computer program products, implementing and using techniques for generating advertisement information for performing a marketing campaign on behalf of an advertiser. The advertiser has an associated computer in communication with a data network. A plurality of electronic publishers in communication with the data network are used. In one aspect, the method includes receiving, over the data network, information describing subject matter of the marketing campaign. Advertisement information is generated based on the received information describing the marketing campaign subject matter. A plurality of instantiations of the advertisement information are generated using publisher parameters associated with the electronic publishers. Each instantiation is in a format appropriate for a respective one of the electronic publishers. At least one of the generated instantiations is provided to the respective electronic publisher over the data network.

BRIEF DESCRIPTION OF THE FIGURES

FIGS. 8A and 8B show keyword tables constructed according to embodiments of the present invention.

Like reference symbols in the various Figures indicate like elements.

DETAILED DESCRIPTION

Figure 1:
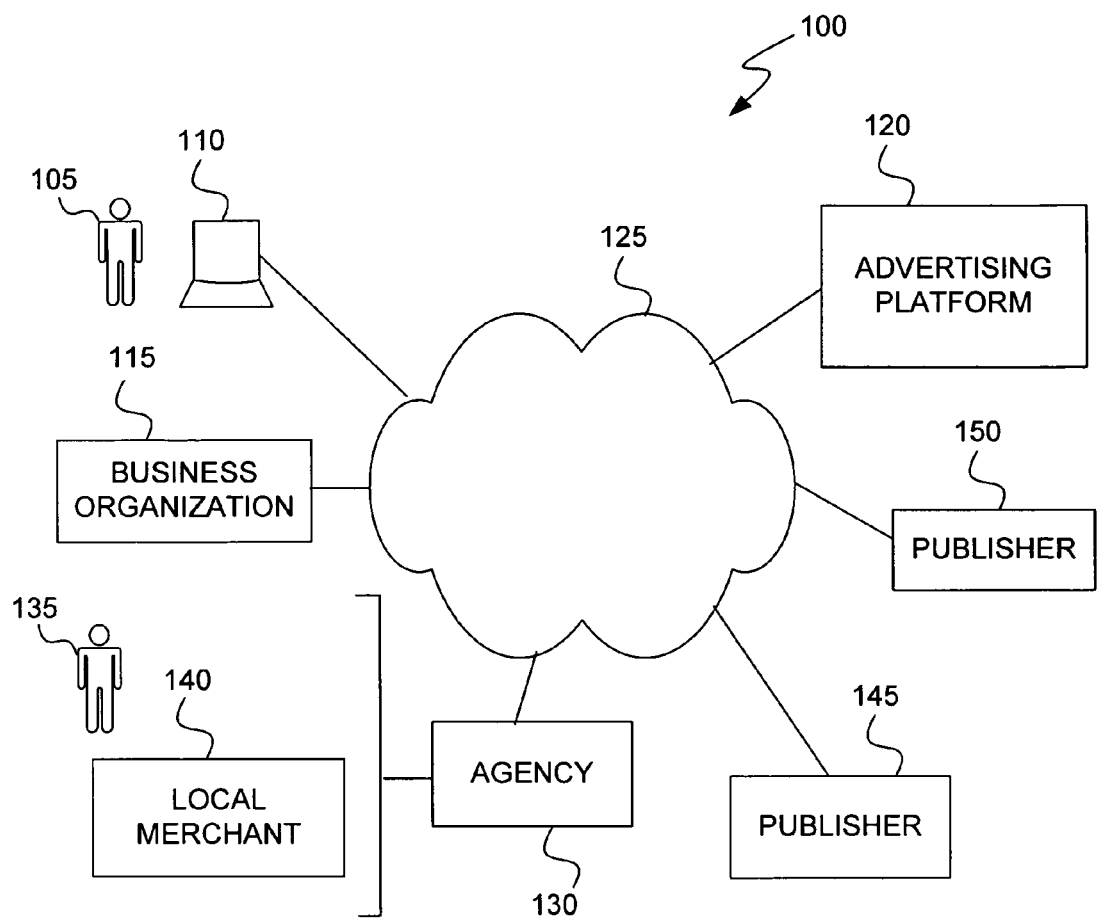
FIG. 1 shows an advertising system 100, constructed according to one embodiment of the present invention.

Embodiments of the present invention provide for an advertising platform enabling advertisers such as sole proprietors, businesses, and essentially anyone wishing to advertise for anything to reach customers over data networks such as the Internet. The advertiser can establish an online presence using the advertising platform. As used herein, "advertising platform" refers to part or all of the apparatus and methods described herein for implementing and conducting a marketing campaign. The advertising platform enables advertisers to reach potential customers in a manner that is easy to use, fast and cost effective. Through a single interface, an advertiser can describe its services and products, indicate to whom and where the marketing should be targeted, and determine how much to spend on the marketing campaign. The advertiser can then create, place, purchase and monitor the effectiveness of the marketing campaign across one or more publishers using the single interface.

The subject matter of the marketing campaign provided by implementations of the advertising platform can be essentially anything. Implementations of the advertising platform allow the advertiser to specify the subject matter when interacting with the advertising platform. In one example, the marketing campaign is conducted on behalf of a local merchant. The subject matter of the campaign includes the products and services provided by that local merchant. Advertisements and directory listings are placed among a number of electronic publishers, described below. In another example, a candidate for public office uses an implementation of the advertising platform to place ads across the same or a different set of the electronic publishers. In this example, the subject matter of the marketing campaign includes information about the candidate. Implementations of the advertising methods and apparatus are robust, as will be shown below, and accommodate a wide range of subject matter.

Some implementations of the advertising platform provide placement of advertisements by various electronic publishers including Internet search engines, e.g., Google, Yahoo, online directories including online yellow page sites, e.g., SuperPages.com, advertiser web sites, e.g., Advertising.com, and online directories. As used herein, "electronic publishers" refers to entities which will receive and display advertisement information on behalf of the advertisers for publishing as part of the marketing campaign. In one implementation, each publisher can receive a certain percentage of the advertiser's campaign budget based on budget allocation methods described below.

The advertising platform described herein enables publishing the advertisements across the various publishers using a number of features including: search engine keyword selection, keyword submission to the various publishers, selection and optimization of keyword bids, ad creation on online yellow pages sites, submission of created ads to online directories, bid optimization for online directories, and creation and submission of banners, textual advertisements, graphic advertisements and other advertisements for targeting to advertiser-defined geographic territories. Geographic targeting of online advertising includes targeting at advertiser-defined granularities including state, designated marketing area ("DMA"), city or town level, and zip code or SCF level including radius-based targeting based on the advertiser's primary zip code. The advertising platform described herein enables the advertiser to create and implement an online marketing campaign without having to learn the complexities of the various publishers advertising techniques and keyword bidding systems or having to establish individual advertising accounts with each of the publishers.

Some implementations of the advertising platform described herein provide the advertiser with a web site or campaign-specific offer page if the advertiser does not already have one. This web site can include one or more campaign-specific offer pages, that is, web pages having text and/or graphics describing an offer of some product or service for purchase by the customer. In one embodiment, the web site includes an electronic coupon which can be printed and/or electronically registered with the advertising platform.

Some implementations of the advertising platform described herein further provide for a proxied web site which proxies the advertiser's web site and enables tracking, that is, monitoring of campaign events such as customer interactions communicating information to the advertiser, e.g., emails, phone calls, coupon registration, accessing of designated HTML pages, further described below. Thus, the overall effectiveness of the marketing campaign can be monitored. In addition, the advertising platform described herein provides reporting of return on investment information.

The advertising platform can be used primarily by two groups of advertisers: (1) individual advertisers, and (2) agencies. An individual advertiser is an individual entity, e.g., person, corporation, partnership, wishing to conduct a marketing campaign. An agency acts on behalf of one or more individual advertisers. In one embodiment, each advertiser subscribes to the advertising platform to access the services described below. An account is set up and maintained by the advertising platform for each subscriber. A billing structure can be implemented as desired including, for example, a subscription fee, weekly billing, monthly billing, etc. When an account is set up for an agency, that account can be subdivided as needed to maintain information for each entity represented by that agency using account management techniques known to those skilled in the art.

FIG. 1 shows an advertising system 100, constructed according to one embodiment of the present invention. In FIG. 1, individual advertisers such as person 105 operating a personal computer 110, and business organization 115, can access advertising platform 120 over data network 125. Personal computer 110 is in communication with data network 125 by any suitable means. Data network 125 is any suitable network for sending and receiving data, such as the Internet. Each individual advertiser 105 and 115 will log into the advertising platform 120. In one embodiment, the log in procedure will include supplying a unique user ID and password issued to the particular advertiser for accessing its own account. Also, in FIG. 1, an advertising agency 130 can access advertising platform 120 in a similar manner as individual advertisers 105 and 115. In this embodiment, advertising agency 130 represents several individual advertisers, including person 135 and local merchant 140.

In FIG. 1, at least two publishers 145 and 150 are also in communication with data network 125. The publishers 145 and 150 are capable of interfacing with advertising platform 120, using techniques described below, to run advertisements on behalf of one or more advertisers. In one embodiment, the publishers 145 and 150 interface with advertising platform 120 over data network 125, as shown in FIG. 1. In an alternative embodiment, publishers 145 and 150 interface directly with advertising platform 120 over any suitable communications link. Implementations of system 100 may include additional publishers, as will be appreciated by those skilled in the art.

Figure 2A:
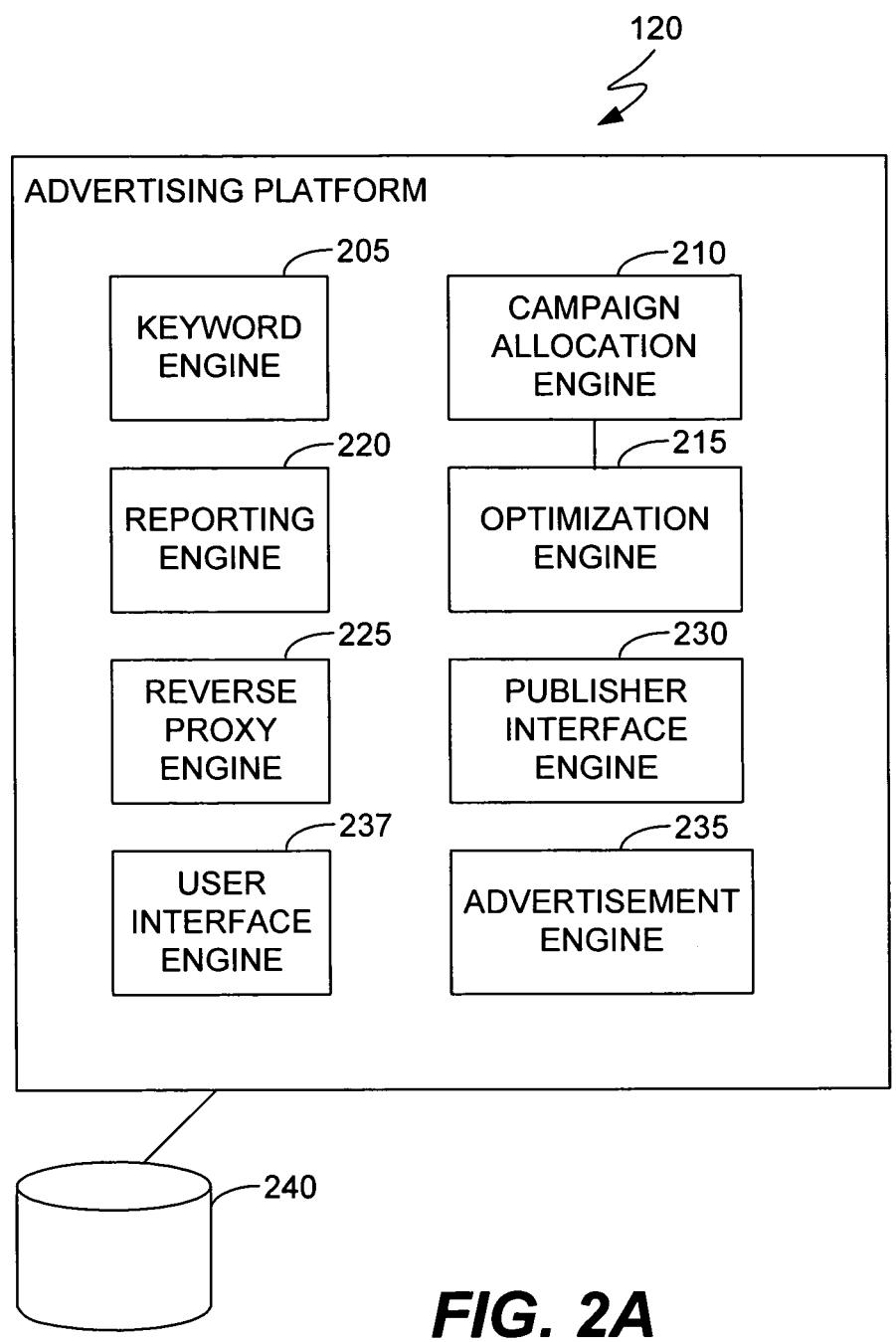
FIG. 2A shows a block diagram of an advertising platform 120, constructed according to one embodiment of the present invention.

FIG. 2A shows a block diagram of an advertising platform 120, constructed according to one embodiment of the present invention. The components of advertising platform 120 include a user interface engine 237 configured to interact with an advertiser computer such as personal computer 110 over data network 125, of FIG. 1. In FIG. 2A, advertising platform 120 further includes a campaign allocation engine 210 which is configured to allocate a budget amount, such as a total campaign budget amount, a total number of leads, or a maximum cost per lead amount, among a plurality of publishers, such as electronic publishers 145 and 150 of FIG. 1. The advertising platform 120 of FIG. 2A further includes an advertisement engine 235 configured to generate advertisement information for running advertisements on one or more electronic publishers. In advertising platform 120, a publisher interface engine 230 is configured to interface with the electronic publishers and provide the advertisement information to those publishers in a proper format. Advertising platform 120 further includes a reporting engine 220, an optimization engine 215, a reverse proxy engine 225, and keyword engine 205. The structure and functionality of these various engines is described below. In addition, a processor readable storage medium 240, such as a database, is in communication with advertising platform 120 and can provide storage of various tables and data structures described below.

Figure 2B:
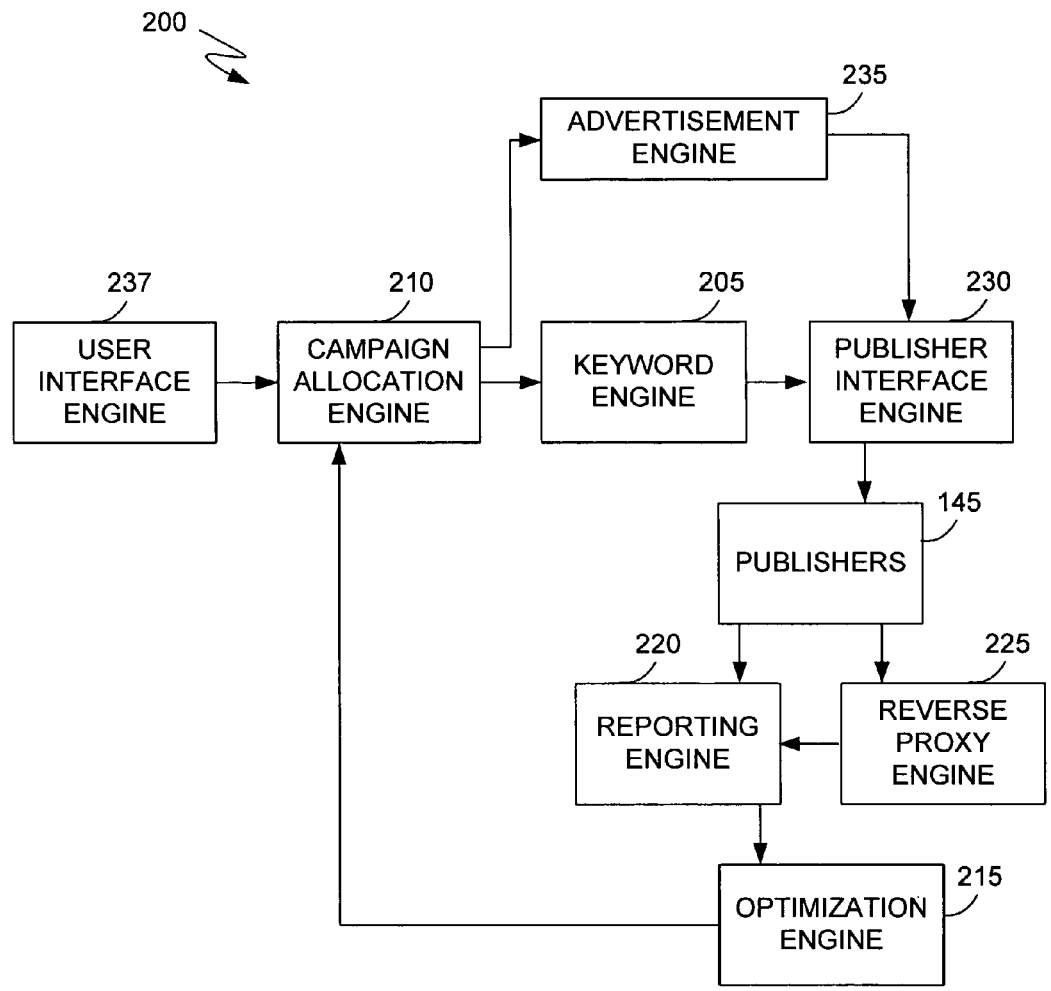
FIG. 2B is a block diagram 200 illustrating the general interaction of the engines of advertising platform 120, according to one embodiment of the present invention.
Figure 2C:
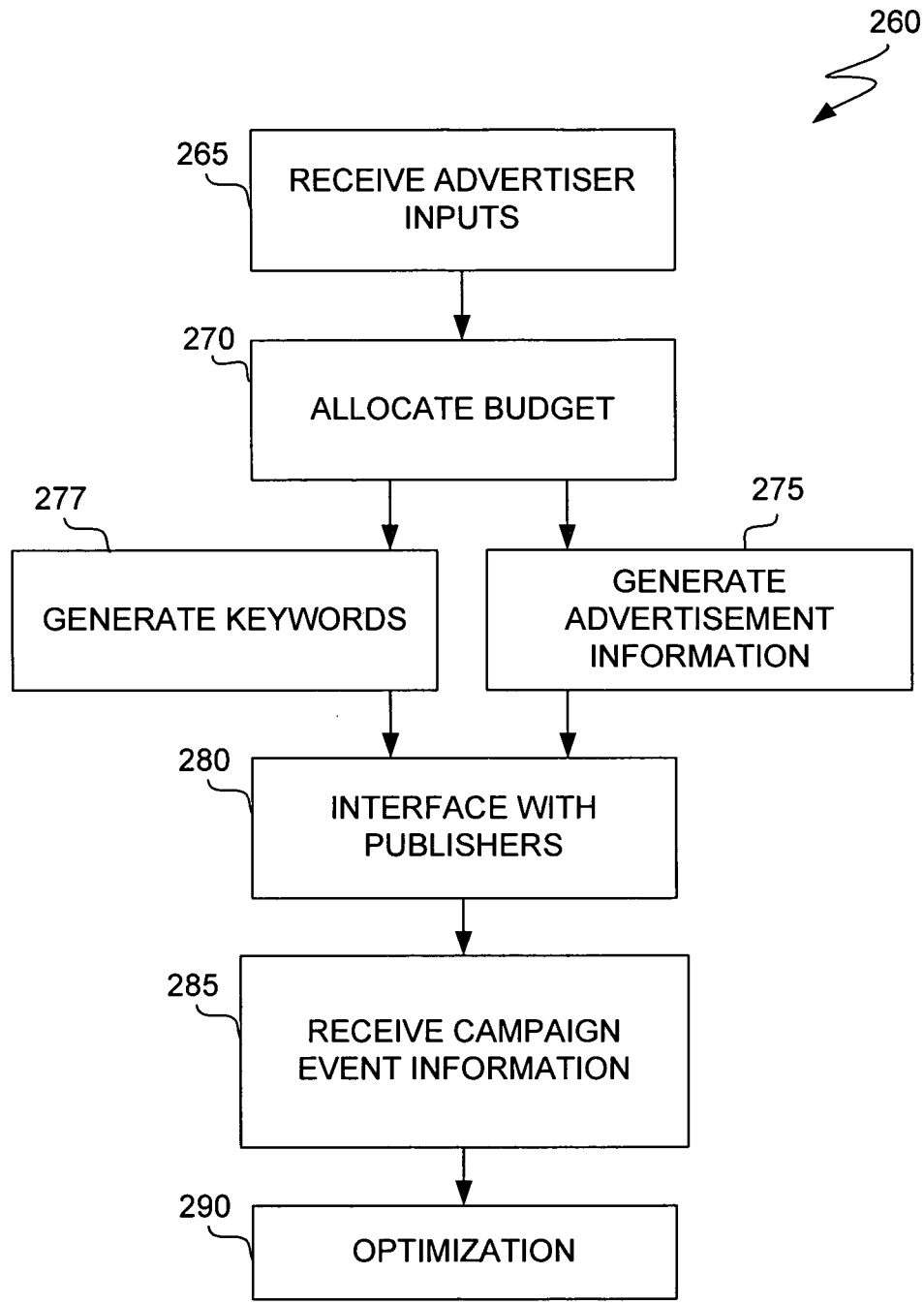
FIG. 2C shows a flow diagram of a method 260 for performing a marketing campaign, performed in accordance with one embodiment of the present invention.

FIG. 2B is a block diagram 200 illustrating the general interaction of the engines 205-240 of FIG. 2A with one or more publishers 145. FIG. 2C shows a flow diagram of a method 260 for performing a marketing campaign, performed in accordance with one embodiment of the present invention. FIG. 2C is described with reference to FIGS. 2A and 2B.

In FIG. 2B, the user interface engine 237 interacts with an advertiser computer 110 over data network 125, as shown in FIG. 1, and receives inputs from the advertiser in Step 265 of FIG. 2C. These advertiser inputs include information which is used by user interface engine 237 to generate a budget amount or a set of campaign objectives, marketing campaign parameters which define the marketing campaign, and information describing the marketing campaign. In FIG. 2B, the budget amount or set of campaign objectives is provided from user interface engine 237 to campaign allocation engine 210. In Step 270 of FIG. 2C, campaign allocation engine 210 allocates the budget amount among a plurality of publishers 145 using the generated marketing campaign parameters and publisher parameters associated with the electronic publishers. These publisher parameters are described below. The budget amount and information describing the marketing campaign from user interface engine 237, and output of campaign allocation engine 210, including the selected publishers for the campaign, are provided to advertisement engine 235. In Step 275, advertisement engine 235 generates advertisement information using the information input to engine 235. Advertisement engine 235 also uses the publisher parameters, as described below. In addition, in Step 277 of FIG. 2C, the output of campaign allocation engine 210 is provided to keyword engine 205 so that keywords can be generated for the campaign, as described below. The generated keywords and advertisement information are provided to publisher interface engine 230.

In Step 280 of FIG. 2C, the publisher interface engine 230 interfaces with publishers 145 using APIs and other techniques to provide the advertisement information to the publishers 145 in a format usable by those publishers 145. The publisher interface engine 230 provides the advertisement information to publishers 145 in accordance with the budget allocation made by campaign allocation engine 210.

In Step 285 of FIG. 2C, after the marketing campaign has begun using publishers 145, information is received by reporting engine 220 and reverse proxy engine 225 of FIG. 2B. Reporting engine 220 receives campaign event information, described below, from one or more publishers 145. In addition, through reverse proxy engine 225, reporting engine 220 gathers campaign event information. In FIG. 2B, the reverse proxy engine 225 is configured to retrieve an advertiser web page from a suitable storage facility such as processor-readable medium 240 of FIG. 2A. The advertiser web page is retrieved responsive to a request from a customer. The advertiser web page can then be rendered as a proxied web page for customizing data presented to the customer. This customization generally includes dynamic editing of the advertiser web page to produce the proxied web page. The proxied web page is then provided for the customer over the data network 125.

In Step 290 of FIG. 2C, an optimization or updating of allocation rules and a refinement of the campaign allocation engine is performed by optimization engine 215 of FIG. 2B.

Various publishers, such as electronic publishers, can be used in accordance with embodiments of the present invention. As mentioned above, suitable electronic publishers include search engines, on-line directories, and on-line yellow pages. In another embodiment, one or more of the electronic publishers is an e-commerce provider. For example, one electronic publisher may be an on-line shopping service or a comparison shopping service. In this embodiment, the advertisement information may include, in addition to the usual textual or graphical advertisements, items for sale in an e-commerce setting. For instance, the item for sale may be any product offered for sale by the advertiser. These e-commerce embodiments are beneficial for on-line or off-line businesses which desire to promote part or all of their inventory over a plurality of e-commerce sites, serving as electronic publishers. In these embodiments, one or more items belonging to the advertiser can be syndicated across a network of publishers. Thus, the advertisement information can include purchase information, transaction information, and other necessary information for conducting e-commerce transactions.

Figure 3:
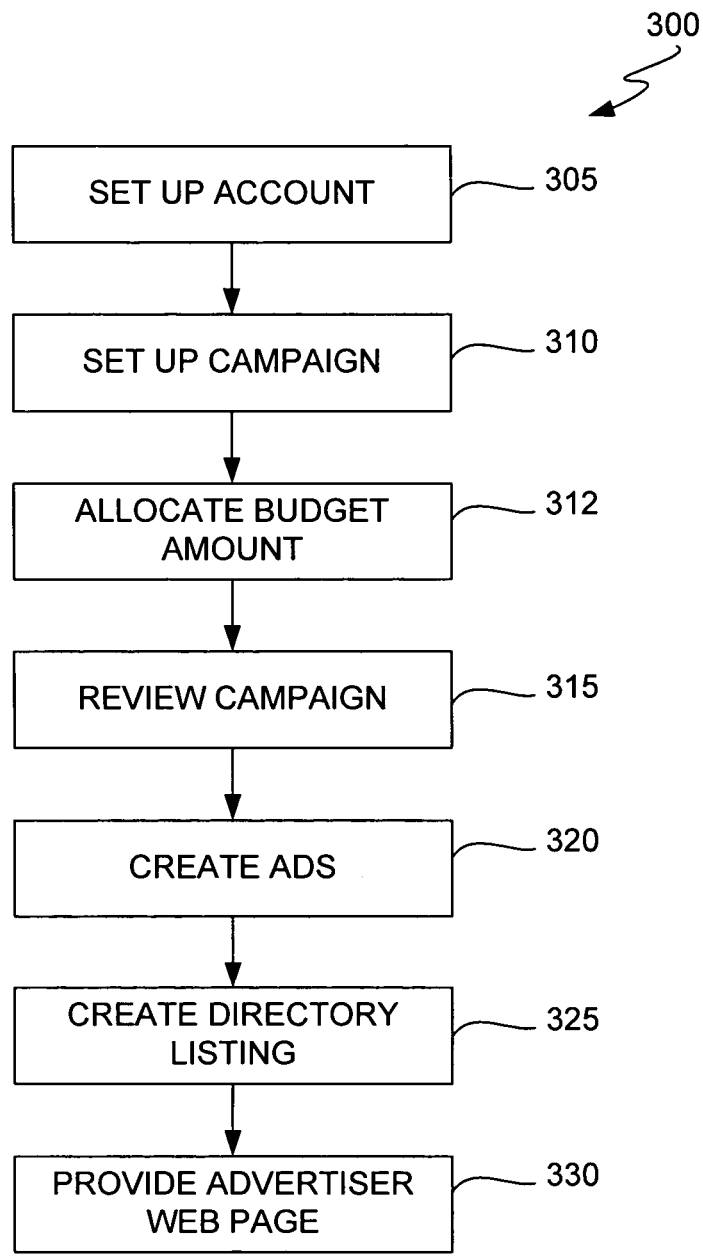
FIG. 3 shows a flow diagram of a method 300 for accessing and using an advertising platform, performed in accordance with one embodiment of the present invention.

FIG. 3 shows a flow diagram of a method 300 for accessing and using an online advertising platform, performed in accordance with one embodiment of the present invention. In one embodiment, the method 300 is performed by advertising platform 120, as shown in FIG. 1, responsive to advertiser inputs. In another embodiment, the method 300 is performed by a server or other data processing system in communication with advertising platform 120.

In Step 305, the advertiser accesses the platform and sets up an account. Examples of advertisers include individual advertisers, agencies acting on behalf of one or more individuals or organizations, and other entities desiring to conduct a marketing campaign. In one embodiment, a business account with certain attributes is provided for agencies. Individual accounts are provided for individual advertisers. The self-service or individual advertiser will maintain an account itself. In one embodiment, the agency will have a single account that manages marketing campaigns for a plurality of advertisers. Depending on the type of advertiser, different levels of the features described below can be provided. Unique user IDs and passwords for login will be provided, using techniques known to those skilled in the art.

In step 305, the advertiser submits registration data including, for example, name, billing address, phone number, fax number, email address, and a URL if available. In Step 310, the advertiser also submits marketing campaign information describing the marketing campaign. All of the submitted information is stored in a memory or other storage medium accessible by advertising platform 120. In one embodiment, the advertiser is prompted to submit such information using text boxes in an HTML page, or using dropdown menus or check boxes as will be understood by those skilled in the art. The submitted marketing campaign information can be used to populate creative templates, such as a destination page or banners, as described below. The marketing campaign information can also be used to generate certain marketing campaign parameters, also described below. The submitted marketing campaign information can also be used to categorize the business within a local directory, as described below.

In one embodiment, the marketing campaign information submitted in Step 310 can include a category identifier which identifies one of a plurality of top-level categories organized in a hierarchical structure and providing a taxonomy for the marketing campaign. Generally, each advertiser is assigned to one top-level category, although in some embodiments, the advertiser can be assigned to more than one top-level category. The identified top-level category and general category taxonomy is then used by the advertising platform for the marketing campaign, as described below.

Also, during Step 310, in one embodiment, the advertiser also submits a city identifier, designated marketing area (DMA) identifier, state identifier, desired radius for targeting from a specific zip code, and possibly other identification of geographical territory indicating a geographical area for targeting the marketing campaign. The city identifier can be used to facilitate city-level browsing of advertiser listings within a local directory. Other uses for this geographic identification information are provided below.

In Step 310 of FIG. 3, the method 300 for accessing and using an online advertising platform continues with setting up the marketing campaign. A campaign budget is determined, in one example, how much the advertiser wants to spend on the marketing campaign, as well as the duration of the marketing campaign. Other features are provided, as described with respect to FIG. 4 below.

Figure 4:
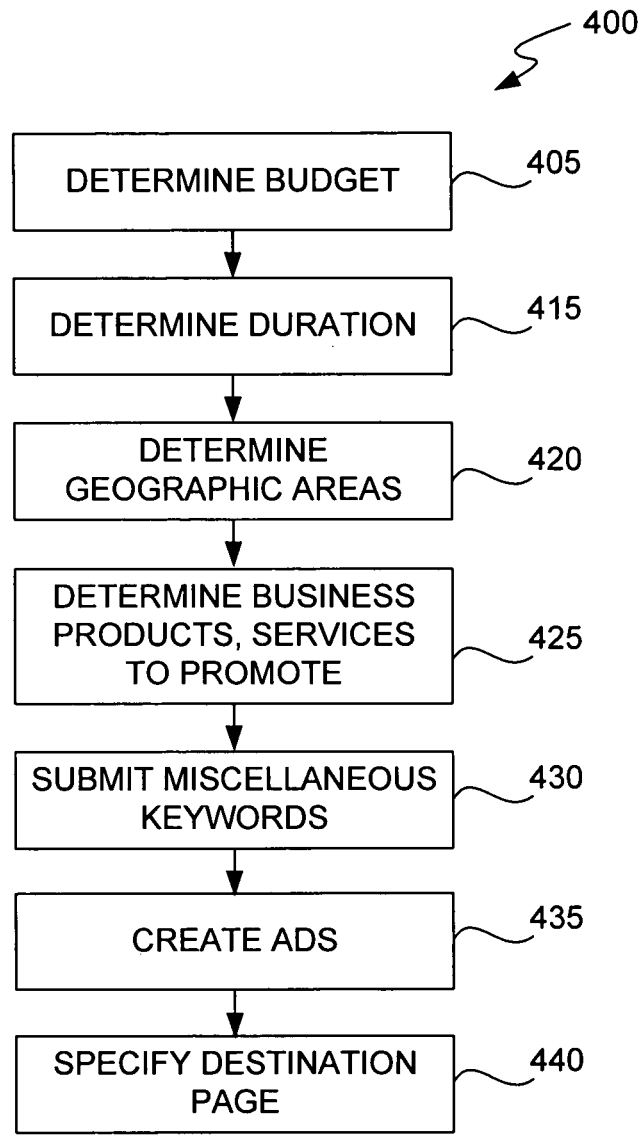
FIG. 4 shows a method 400 for setting up a marketing campaign using an advertising platform, performed in accordance with one embodiment of the present invention.

FIG. 4 shows a method 400 for setting up a marketing campaign in accordance with one embodiment of the present invention. Method 400 is generally performed by user interface engine 237 during the campaign setup Step 310 of FIG. 3, responsive to advertiser input. In Step 405, a budget is determined by the advertising platform 120 based on a set of objectives provided by the advertiser, or as specified by the advertiser. In one embodiment, through a user interface displayed on the advertiser's computer, the advertiser interacts with user interface engine 237. Using the user interface engine 237, the individual advertiser or agent enters a desired budget amount to spend on the marketing campaign.

There are several different budget amounts which are used, depending on the desired implementation. In one embodiment, the user enters an objective amount to spend on the entire marketing campaign. This amount can provide a target for the campaign allocation, that may or may not be satisfied depending on the desired number of leads, publishers, and advertisements placed in the marketing campaign. In another embodiment, the budget amount is a maximum spend amount for the entire campaign, or a maximum spend amount per publisher. The advertiser can be allowed to indicate a fixed total spending amount for the marketing campaign, e.g., $600 per month or $20 a day. In one example, the advertiser is allowed to indicate fixed cost per lead, e.g., $2 per lead. As used herein, "lead" generally refers to a request for information from the advertiser by a customer, in response to an advertisement placed by advertising platform 120. For example, leads include phone calls to the advertiser, emails sent the advertiser, responses to specific advertisement offers, and in-person visits to the advertiser's place of business. In another example, the budget amount includes a maximum spend per lead amount.

In step 410, the user interface engine 237 interacts with the advertiser to define a preferred number of leads. In one embodiment, user interface engine 237 can provide the advertiser with an estimated number of leads based on the entered budget amount, using a table of stored historical data. The advertiser can then modify the budget amount accordingly. The user interface engine 237 provides the advertiser with estimates, as the desired budget is dependent upon the desired number of leads and vice versa. Thus, in one embodiment, the user interface engine 237 estimates the budget required based on the cost required to obtain the desired number of leads.

In Step 415 of FIG. 4, the advertiser inputs a duration for the marketing campaign. The advertiser can select a start date and end date for the marketing campaign. Preferably, the indicated duration may be modified by the advertiser through the course of the marketing campaign. Duration information can be provided in different forms. In one embodiment, the advertiser can customize the duration of advertisements placed on specific publishers.

In Step 420 of FIG. 4, as part of campaign setup Step 310, the advertiser inputs geographical areas for targeting the marketing campaign. This geographical targeting is beneficial, as it allows advertisers to target ads to various levels of geographic territory. Different levels of geographic information are inputted by the advertiser through an appropriate user interface. In one embodiment, such information includes the following designations: "global" indicating no geographic restrictions, "national" designating the United States only, "DMA" indicating one or more DMAs with standard classification codes associated with those DMAs, "city" indicating a city or town within the designated DMA, sectional center facility ("SCF") referring to the first three digits of one or more zip codes, "zip code" indicating a particular zip code, and "radius" referring to a certain mile radius from the advertiser's business address or other designated address within which consumers should be targeted. In one embodiment, a sequence of dropdown menus are provided to the advertiser to facilitate the selection of geographic areas. For instance, in one embodiment, the advertiser inputs a particular DMA, followed by a dropdown menu listing cities and towns within the selected DMA. In this embodiment, a table is maintained on a suitable storage medium in which each town and city in the United States is mapped to a DMA so that such lists can be provided.

Figure 5:
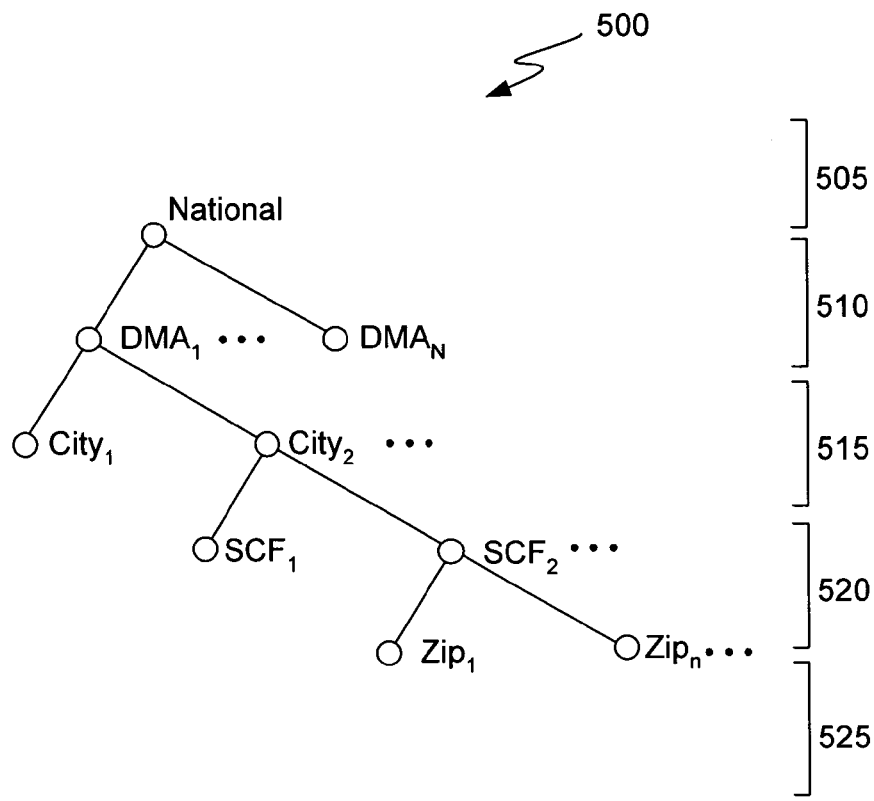
FIG. 5 shows a data structure 500 providing a taxonomy of categories providing geographic territories for targeting a marketing, in accordance with one embodiment of the present invention.

FIG. 5 shows an organizational structure 500 of a processor-readable storage medium such as a database, providing geographic territories for targeting a marketing campaign. The processor-readable storage medium in which data structure 500 is stored can be a component of advertising platform 120, or a separate component in communication with advertising platform 120. In one embodiment, the data is organized in a hierarchical structure of categories providing a taxonomy for targeting the marketing campaign. In the data structure 500 of FIG. 5, a top-level category indicates whether the geographic territory for the marketing campaign should occur on a national level 505. Under the national level are lower level categories including DMA level 510, city level 515, SCF level 520, and zip code level 525. In one embodiment, each lower level category provides sub-geographic categories within the upper level category to which the lower level category belongs, as shown in FIG. 5. As used herein, upper level categories refer to those in the hierarchy that are above any lower level category in the data structure. For instance, national level 505 is an upper level with respect to DMA level 510, and both national level 505 and DMA level 510 are upper levels with respect to city level 515. Similarly, zip code level 525 is a lower level with respect to SCF level 520, and both SCF level 520 and zip code level 525 are lower levels with respect to city level 515. In another embodiment, lower level categories are not always sub-categories of an upper level category.

In one embodiment, geographic information includes latitude and longitude information provided for each city or town in category 515 of FIG. 5. Such information can be used to calculate the distance from the advertiser's business location when performing a "radius" calculation. For instance, using the latitude and longitude information, the advertising platform can determine a list of cities within a 50-mile radius of the advertiser's business and use that information for generating keywords, described below, or for simply supplying the names of those cities/DMAs. Alternatively, given the list of cities an advertiser wishes to target, the radius can be calculated from the advertiser's place of business and supplied. Such distance calculation software is available, as will be appreciated by those skilled in the art.

Figure 6:
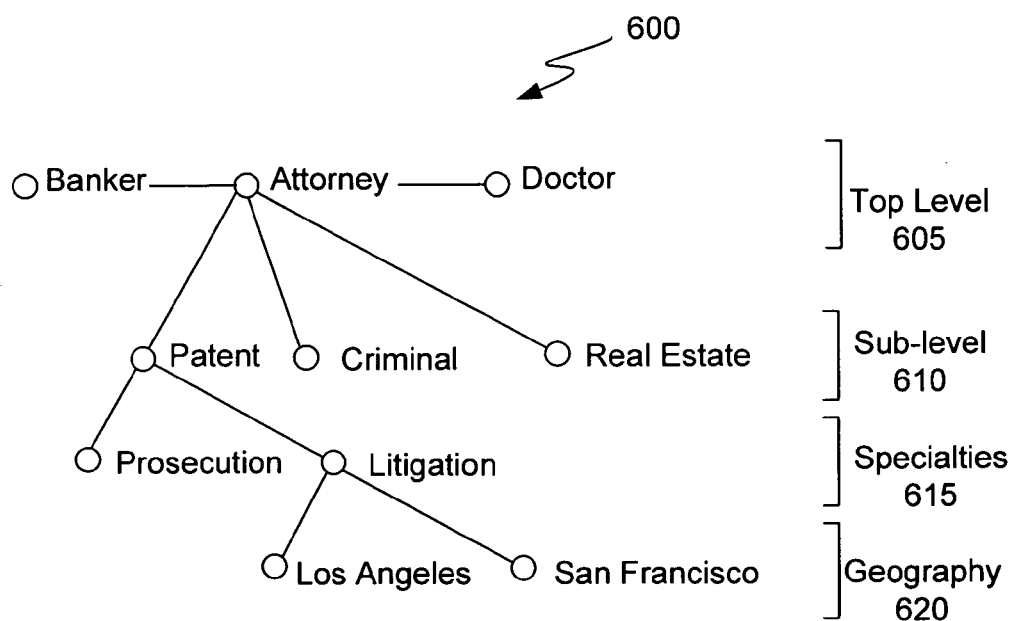
FIG. 6 shows a data structure 600 providing a taxonomy of categories for conducting a marketing campaign, in accordance with one embodiment of the present invention.

In Step 425 of FIG. 4, the advertiser enters marketing campaign information describing subject matter for the marketing campaign. As mentioned above, the subject matter of the campaign can be essentially anything the advertiser wishes to promote. In one example, the advertiser indicates specific areas of business for which advertising is desired. In one embodiment, a hierarchical structure of categories is provided as a data structure 600, as shown in FIG. 6. This hierarchical structure of categories provides a taxonomy with levels of granularity in characterizing a marketing campaign. At a top level 605, an advertiser is associated with one of the top level categories. In this example, the advertiser is a law firm and is, therefore, associated with the "attorney" top-level category. Under the "attorney" category are a plurality of lower level categories for further characterizing the attorney. In one example, subcategories at level 610 include "patent," "criminal," and "real estate." These categories in level 610 are further divided in a lower level 615. In this example, the lower level categories 615 are specialties, representing specific services which can be performed by patent lawyers. As with the geographical data structure 500 in FIG. 5, the data structure 600 of FIG. 6 is organized in a hierarchical manner and provided in a suitable storage medium such as a database.

In step 425 of FIG. 4, the categories and subcategories shown in FIG. 6 can be provided to the advertiser by user interface engine 237 in a dropdown menu in a user interface, in one embodiment. In another embodiment, the marketing campaign information is input directly by the advertiser. The advertiser can then select the appropriate categories to characterize the products or services offered as part of the marketing campaign.

In Step 425 of FIG. 4, categories at the various levels are assigned to and associated with the advertiser to properly identify and provide keywords, described below, for that advertiser's marketing campaign. For instance, a patent prosecution firm would have associated categories at three levels of FIG. 6, including "attorney" at level 605, "patent" at level 610, and "prosecution" at level 615. In one embodiment, the categories associated with the particular advertiser can be used to generate keywords for that advertiser's marketing campaign and also in estimating a budget for the marketing campaign by accessing a table of stored historical data describing the approximate leads for the selected categories.

In FIG. 6, the taxonomy of categories are arranged such that the subcategories belong to one or more upper level categories as shown in FIG. 6. For instance, the lower level categories "patent," "criminal," and "real estate" all belong to the upper level category "attorney." In one embodiment, as shown in FIG. 6, a further lower level of specialties is provided at level 615. In this example, a lower level 620 indicates geographic areas for the advertiser. Thus, for instance, potential clients of patent litigation firms in San Francisco could be targeted using the appropriate categories in levels 605, 610, 615 and 620. Those skilled in the art should appreciate that the categories shown in FIG. 6 are only exemplary, and may be alternatively labeled and further subdivided as desired for the particular implementation.

In Step 430 of FIG. 4, after the advertiser selects the categories from the lists provided, e.g., in dropdown menus, the advertiser is then presented with the opportunity to submit additional categories or keywords which the advertiser believes further describe the services or products of the marketing campaign to ensure that such terms are submitted during publishing of advertisements for that campaign. For instance, in the example above, a patent prosecution firm could submit additional keywords such as "utility patents," "design patents," and "plant patents" as additional miscellaneous keywords describing the services provided by that firm.

Returning to FIG. 3, after the campaign is set up in Step 310, the budget amount is allocated among one or more electronic publishers by campaign allocation engine 210, as described below with reference to FIGS. 9A and 9B. The proposed marketing campaign is presented to the advertiser in Step 315, and can be reviewed and adjusted as desired before proceeding with the campaign. One of the determinations which can be made during campaign review, in accordance with embodiments of the present invention, includes determining whether the budget of Step 405 is still sufficient based on the number of categories and specialties selected in FIGS. 5 and 6. This determination is made based on historical data indicating the estimated cost of minimum bid per click amounts of keywords corresponding to the categories selected by the advertiser. If the original budget estimate is insufficient, the advertiser is provided with a message through user interface engine 237 recommending that the budget amount be increased. The computation involves iterating through all of the keyword groups, described below, that are associated with the selected categories, specialties, and subspecialties selected, looking at the minimum bid per click amounts and the expected number of clicks, and comparing that to the total budget allocated to the marketing campaign. If the resulting budget is insufficient, several events can occur. The advertiser can increase the budget, the number of keywords or keyword groups can be automatically adjusted by platform 120 as needed, the advertiser can be alerted to: (1) reduce the scope or number of geographies selected, or (2) reduce the number of products and/services to promote.

In Step 320 of FIG. 3, an advertisement engine 235 generates advertisements for the marketing campaign based on the information provided by the advertiser in Steps 305 through 315. Advertisement engine 235 creates advertisement information based on the received information describing the marketing campaign, and a plurality of publisher parameters. Examples of suitable advertisement information include banner ads, keyword ads, textual ads, graphical ads, items for sale, products, services, purchase information, transaction information, and other similar information of interest to customers. In addition, advertisement information will often include budget amounts, duration, one or more categories, keywords, geographic information, and other information useable by the various electronic publishers to run the advertisements. The advertisement information generated by advertisement engine 235 is provided to publisher interface engine 230, shown in FIGS. 2A and 2B, where the advertisement is formatted in formats suitable for display by the selected publishers from method 300. These formats will vary depending on whether the publisher provides a search engine, advertisement web site, online directory, or other service. Suitable APIs are provided in publisher interface engine 230 for interfacing with the publishers, as will be understood by those skilled in the art. In one example, in Step 325 of FIG. 3, a directory listing can be made for the advertiser for display in an online directory such as an online yellow pages. Keywords selected for the marketing campaign and/or headlines used in advertisements such as banner ads can be used in the online directory listing. The particular publisher receiving the advertisement will have specified the format of the advertisement. The number of advertisements and number of publishers, as well as the selected publishers, will depend greatly on the campaign budget determined in Step 405 of FIG. 4.

In Step 330 of FIG. 3, an advertiser web page can be created or identified by the advertiser, the location of which is provided to the advertising platform. The advertiser web page will be the intended destination for customers which respond to the advertisements submitted to the various publishers. The advertiser web page is generally in the form of an HTML page. In one embodiment, the advertiser web page is included as part of an existing website implemented by the advertiser separate and apart from the advertising platform 120. In another embodiment, when the advertiser does not have an existing website or has an existing website but wishes to develop a campaign-specific offer page, a website creation tool is incorporated into advertising platform 120 for assisting the advertiser in creating an advertiser web page. The website creation tool can provide examples of suitable destination pages for modification by the advertiser. The advertiser web page can be created using template software and other tools generally known to those skilled in the art, to facilitate creation of the advertiser web page by the advertiser. The location of the advertiser web page can be identified by providing a URL for the page.

Figure 7:
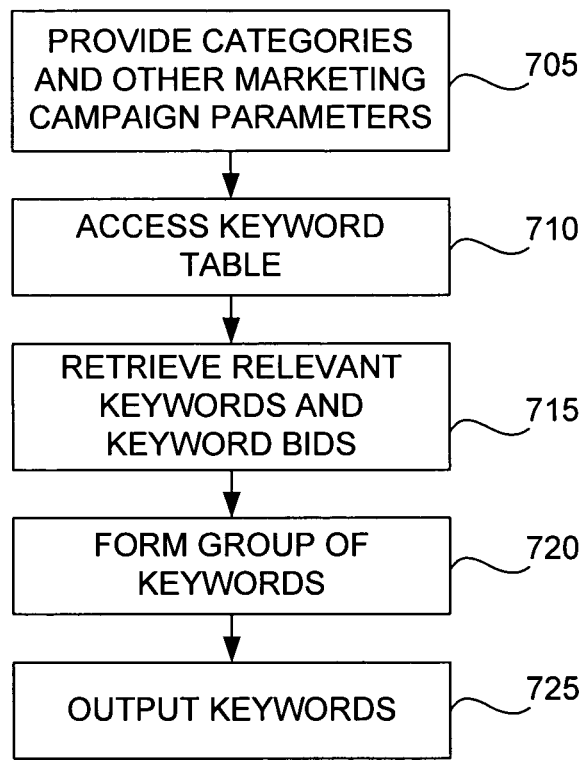
FIG. 7 shows a method 700 for generating keywords, performed in accordance with one embodiment of the present invention.

FIG. 7 shows a method for generating keywords based on the marketing campaign information and category information describing the individual advertiser. This method 700 is performed by keyword engine 205 of advertising platform apparatus 120 shown in FIG. 2. The keywords generated by method 700 are provided to publishers such as search engines that use keywords for delivering advertisements to advertisers of those search engines who enter search queries which match the keyword or keywords that the advertising platform 120 purchased on behalf of the advertiser. The method of 700 of FIG. 7 is beneficial because the advertiser does not have to determine individual keywords. Instead, a table of keywords is assembled with keywords associated in groups, as shown in FIG. 8A. These groups are related to the advertiser's designated business categories and specialties, as described above with respect to FIGS. 5 and 6. By group ID, the keywords are typically assigned a maximum bid per click, and a number of bidders, as shown in the two far-left columns in FIG. 8B. Because methods and apparatus according to embodiments of the present invention group individual keywords into keyword groups, the rules for keyword bids generally occur at the keyword group level. In one embodiment, keywords are single words, e.g., "BMW." In another embodiment, the keyword is a string of multiple words, e.g., "Beverley Hills."

When grouped together, keywords form a "keyword group." The keyword group can include essentially any number of keywords. The business rules for how keywords are assembled and how they are bid for are contained in one or more keyword tables. In one embodiment, as shown in FIG. 8A, a first keyword table includes the following fields: keyword name and keyword group ID. This table is used to identify the keywords associated with a given keyword group ID. That is, all of the keyword names associated with a particular keyword group ID can be identified in the first column as associated with a keyword name. FIG. 8B shows a second keyword table which can be used for keyword group IDs. The keyword table of FIG. 8B includes the following fields: geography, category, publisher ID, keyword group ID, keyword group bid amount, campaign budget, number of bidders, and current max bid. Using the table of FIG. 8B, for every geography, category, and publisher, and possibly other marketing campaign parameters, both a keyword group bid amount and keyword group ID can be determined. The publisher or publishers are determined in step 970 of FIG. 9B, as described below.

In Step 705 of FIG. 7, the budget, geography, categories, and possibly other parameters are provided. The categories can include categories, subcategories, and specialties associated with those subcategories as lower level categories, and in some instances, subspecialties such as geographic subspecialties associated with the specialties. These selections were made by the advertiser when specifying the nature of the campaign in Step 425 of FIG. 4. In a table or tables such as those shown in FIGS. 8A and 8B maintained by the keyword engine 205 of FIG. 2, keywords and keyword bid amounts associated with the various categories are accessed in Step 710. Those keywords and keyword bid amounts are retrieved in Step 715. In one embodiment, individual keywords are retrieved for each category and specialty in the hierarchical structure of data and then formed as a group in Step 720. In another embodiment, groups of keywords are stored in the keyword table of FIG. 8A and accessed by keyword group ID. These keywords are then retrieved and can be output individually or can then be output as one group in Step 720.

In Step 705 of FIG. 7, the categories provided can include geographical territories, as described above. For example, an advertiser may have specified a specific DMA, city, zip code and/or radius to target their ad. In one embodiment, for publishers using customer IP addresses to target the ad, the ad can be displayed when the keyword term is used by someone in the specified DMA. Those skilled in the art will appreciate that the various categories, geographies, etc. can be used to cross-reference other tables such as the category taxonomy structure of FIGS. 5 and 6.

In one embodiment, as shown in FIG. 8B, a keyword table can include additional information including bidding amounts indicating how much to bid on each keyword for various publishers. The "keyword group bid amount" field contains rules for how much to bid for each keyword group on behalf of the advertiser. For some publishers, every individual keyword has its own specified bid. Other publishers allow a single maximum bid to be assigned to a group of keywords, which facilitates the use of the keyword groupings provided by embodiments of methods and apparatus of the present invention.

In FIGS. 2A and 2B, the advertising platform 120 includes a publisher interface engine 230 which interfaces with publishers to submit keywords, advertisements, and otherwise interact with the publishers on behalf of advertisers of the advertising platform 120. In one embodiment, application programming interfaces (APIs) are generated by publisher interface engine 230 and used as needed to interface with the publishers. Categories selected by the advertiser can be mapped to publisher-specific taxonomies. The publisher interface engine 230 takes into account publisher-specific business rules, publisher-specific ad requirements, and publisher-specific account creation requirements, all of which are considered "publisher parameters." Other publisher parameters are used by the advertising platform 120, as described below. The advertiser does not to need to interact directly with any one publisher. The APIs provided by publisher interface engine 230 receive information provided by the advertiser, e.g., categories, advertisements, keywords, format that information based on the specific requirements of the publisher, and submit that information to the publisher on behalf of the advertiser.

The various categories, geographic areas, and keywords described above are provided as marketing campaign parameters by the advertising platform 120. In some embodiments, the marketing campaign parameters further include demographics, such as populations, associated with geographic regions. In some embodiments, the marketing campaign parameters further include psychographics for targeting the marketing campaign. The demographic and psychographic information can be generated using similar techniques as that provided for the categories, keywords, and geographic areas, as set forth above.

In FIG. 4, the recommended budget is calculated based on data in campaign allocation rules and campaign allocation and destination data tables. In one embodiment, the budget is determined according to the following calculation. First, the total number of desired leads indicated by the advertiser is divided by the total number of days in the duration of the campaign, ascertained in Step 415, to determine a target daily lead amount. Second, based on the target geographies and selected categories, and based on historical costs for each lead for those target geographies and categories, a total campaign budget is calculated and a preliminary budget allocation is made. In an alternative embodiment, an advertiser submits a budget and then, based on the budget, the target geographies, and business categories, an initial allocation is made. From the approximate allocation of budget across publishers, it can be determined what the overall campaign budget should be by aggregating the daily costs for each publisher, summing them, and then multiplying by the number of days in the campaign.

Figure 9A:
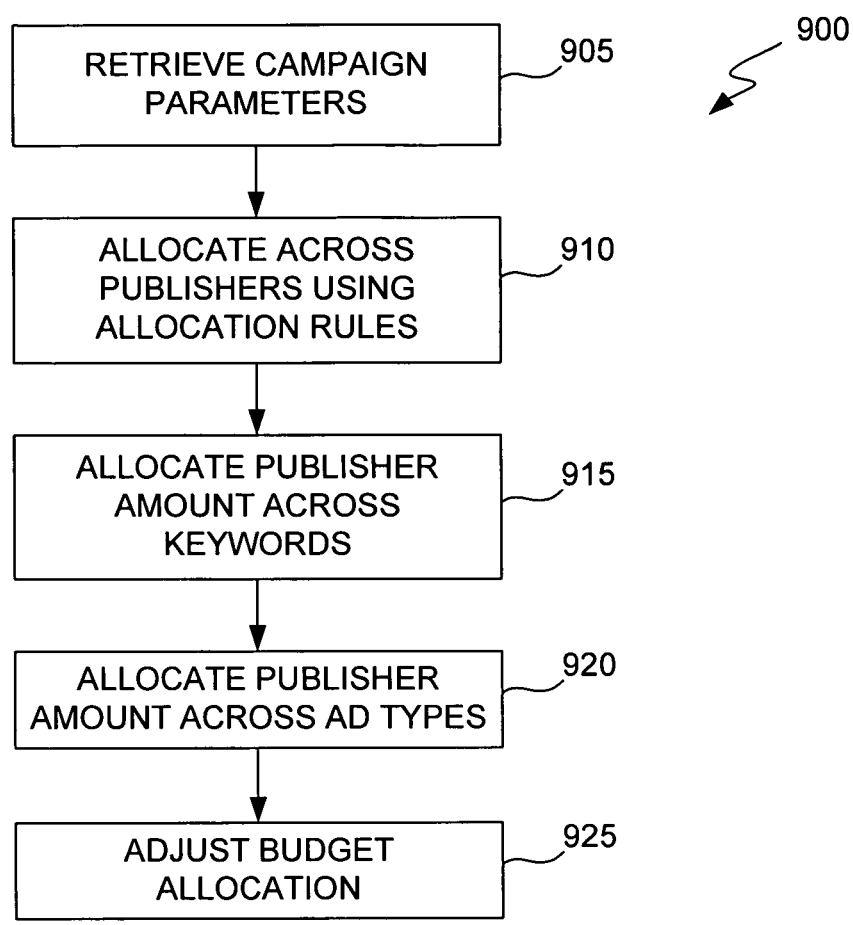
FIG. 9A shows a flow diagram of a method 900 for allocating a budget among a plurality of publishers for a marketing campaign, performed in accordance with one embodiment of the present invention.

FIG. 9A shows a flow diagram of a method 900 for selecting publishers for a marketing campaign and allocating expenditures among the selected publishers, performed in accordance with one embodiment of the present invention. In one embodiment, the method of FIG. 9A is performed by campaign allocation engine 210 in advertising platform apparatus 120.

In FIG. 9A, the method begins in Step 905 with retrieving information provided by the advertiser during campaign setup in Step 310 of FIG. 3 and the method of FIG. 4. In one embodiment, this information or marketing campaign parameters include a campaign budget, duration, type of campaign, e.g., fixed budget, fixed cost per lead, cost per lead, cost per click, geographic target area, and category information. Such information can be stored in and retrieved from a table such as publisher allocation table 1000 shown in FIG. 10. The retrieved parameters from Step 905 are then used to allocate the budget across one or more publishers, in Step 910, according to one or more allocation rules. In one embodiment, the advertiser selects the publishers from a list. In another embodiment, the platform 120 recommends an optimal selection of publishers based on the marketing campaign parameters. Then, within a particular publisher, the budget is allocated across keyword groups and/or advertisement types.

Figure 10:
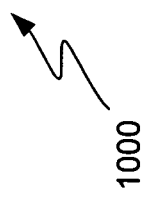
FIG. 10 shows a publisher allocation table 1000 constructed in accordance with one embodiment of the present invention.

In FIG. 10, the publisher allocation table includes the following entries: publisher 1 1002, publisher 2 1005, and possibly additional publisher fields which identify all of the publishers available to receive the advertisement by name or identification number or code. Preferably, each row in the table has IDs for every publisher so that a 100 percent allocation can be enforced row by row. A category ID 1010 provides a category in each row, as described above, with respect to FIGS. 5 and 6. When an advertiser has selected multiple categories, a weighted average allocation can be made across the relevant rows. In addition, the table 1000 includes a Geo ID 1015, which identifies a geographic area for targeting the marketing campaign, selected by the advertiser, as described above with respect to FIG. 5. In addition, the table includes daily campaign budget amounts minimum 1020 and maximum 1025 for each publisher. Preferably, the indicated daily campaign budget minimum and maximum "amounts" in columns 1020 and 1025 are actually bands providing a range of amounts for which the allocation will apply. In one embodiment, the specific allocation performed in step 910 is an interactive process in which the campaign allocation engine 210 provides recommended allocations to the advertiser which can be adjusted as desired. In another embodiment, the allocation is determined entirely by campaign allocation engine 210 based on the information in table 1000 and possible additional historical data assessing the likelihood of obtaining leads using each publisher and the designated categories and keywords.

In FIG. 9A, in one embodiment, after allocating the budget across the selected publishers, in Step 915, the budget for each publisher can be allocated across keyword groups to be submitted to the particular publisher. In performing step 915, a table similar to that shown in FIG. 10 is provided for each publisher, in which average cost per click amounts are provided for a list of keywords or groups of keywords. Those skilled in the art should appreciate that certain publishers may only provide banner advertisements or other marketing techniques than keywords, in which case step 915 can be skipped. In Step 920, advertisers providing different types of advertisements are addressed. In Step 920, the campaign allocation engine 210 allocates budget amounts for particular publishers across ad types provided by the particular publisher. Again, a table similar to that shown in FIG. 10 can be provided for each publisher, in which a list of ad types provided by a particular publisher and associated average costs are set forth.

Those skilled in the art should appreciate that, in certain embodiments, when an advertiser is allowed the flexibility to select a fixed total campaign budget, or to set a maximum cost per lead, or to be billed on a cost per click versus a cost per call basis, then different allocation rules enforced by campaign allocation engine 210 can be established based on those different campaign types.

In another embodiment, in which an advertiser selects multiple geographic IDs or territories to target, each geographic area may have its own allocation rules. In this situation, additional rules are provided to manage how the budget gets divided across geographic areas. In one embodiment, a weighted average distribution is made based on population. In another embodiment, the advertiser is allowed to specify a weighting. In another embodiment, there are national and regional variants of each keyword group. The budget for a keyword publisher is allocated between the two variants, across each of the keyword groups delivered to a publisher.

In step 925 of FIG. 9A, certain adjustments can be made as desired by the advertiser to adjust the marketing campaign. The budget allocation can be adjusted using empirical data gathered from monitoring the leads from actual the advertisements placed across the various publishers. For keyword publishers, the allocated budget amount can be adjusted at the keyword group level or at the category level.

Figure 9B:
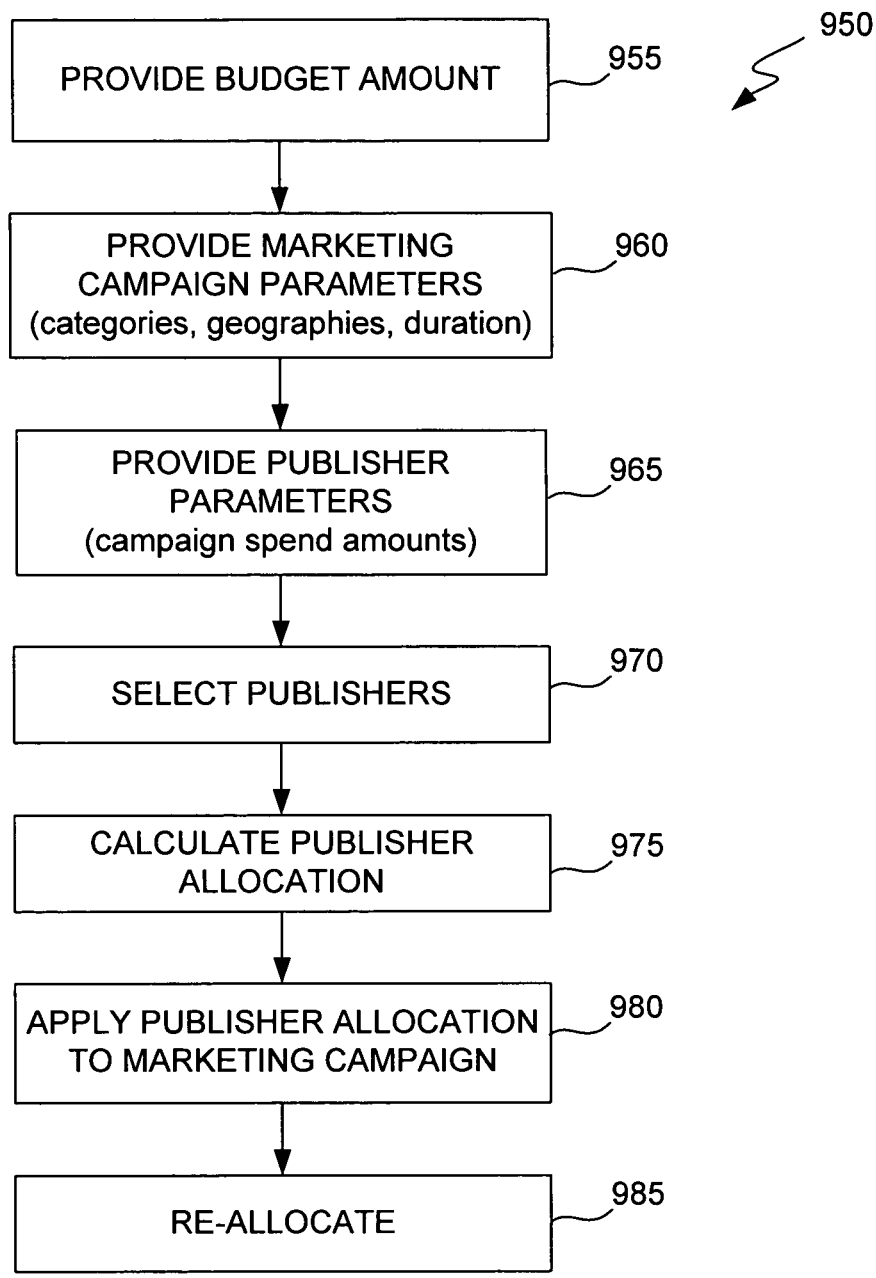
FIG. 9B shows a flow diagram of a method 950 for allocating a budget among a plurality of publishers for a marketing campaign, performed in accordance with one embodiment of the present invention.

FIG. 9B shows a method 910 for allocating a campaign budget among a plurality of electronic publishers, in accordance with one embodiment of the present invention. In Step 955 of FIG. 9B, the budget amount determined for the marketing campaign is retrieved. This budget amount can be in any of several forms as described above, depending on the desired implementation. In Step 960, marketing campaign parameters are retrieved. These marketing campaign parameters generally include categories, geographies, and duration information for the marketing campaign, developed by user interface engine 237 as described above. For example, a category describing subject matter of the marketing campaign could be "dentist." The duration of the marketing campaign could have a target of 30 days, and geographic areas for targeting the marketing campaign could include San Francisco and San Jose. In addition, in some embodiments, the marketing campaign parameters may also include demographic information and psychographic information for targeting the marketing campaign.

In Step 965 of FIG. 9B, publisher parameters are retrieved by the campaign allocation engine 210. The publisher parameters generally include a number of values, including a minimum campaign spend amount and a maximum campaign spend amount, both on a daily basis as well as for an entire campaign. In one embodiment, the minimum and maximum campaign spend amounts are determined by the user for the entire marketing campaign, as described above with reference to user interface engine 237 of FIGS. 2A and 2B. In one embodiment, in Step 970, the specific publishers to be used for the marketing campaign are selected by accessing a table stored on a processor-readable storage medium using one or more of the marketing campaign parameters described above. A table look-up operation is performed, as will be understood by those skilled in the art. The designated electronic publishers are retrieved from the table in accordance with the marketing campaign parameters provided to the table. This table can be updated by optimization engine 215 throughout the course of the marketing campaign and other marketing campaigns conducted on behalf of other advertisers, to keep the campaign allocation optimized. In one embodiment, when the publishers to be used for the marketing campaign are determined, in accordance with the generated marketing campaign parameters, publisher parameters are also retrieved from the table for each of the selected publishers, in Step 965. The publisher parameters can include a maximum potential daily budget for each selected publisher, a total daily click or impression inventory, an average cost per click or impression for each electronic publisher, maximum potential daily budget, average click-to-lead ratios, average impression-to-lead ratios, number of current advertisers, number of current bidders, and other information for the selected electronic publishers. In one embodiment, an average cost per click amounts can be given as initial estimates to the advertiser when creating a campaign in step 310 of FIG. 3 to better estimate how many clicks and leads they should expect to receive based on their budget.

In one embodiment, there are unique publisher parameters for each publisher depending on the particular category or categories selected and geography. For instance, a total daily click inventory in one example is 10,000 clicks per day on Google for "dentists" in Los Angeles. The average cost per click for the publisher is $1.50 per click on Google for "dentists" in Los Angeles. The average click-to-lead ratio, another publisher parameter, is also provided for the particular category and geography, e.g., 10 percent of clicks generate leads for Google for "dentists" in Los Angeles. The average click-to-lead ratio is preferably calculated for various ranges of click or impression volume to determine when there is an optimal number of clicks to leads. That is, there are diminishing returns after a certain point. In one embodiment, one or more publishers have minimum and maximum daily campaign spend amount requirements. In another embodiment, a publisher has a minimum and maximum total campaign spend requirement.

In Step 975 of FIG. 9B, using the provided marketing campaign parameters and publisher parameters, the budget amount is allocated among the selected electronic publishers from Step 970 according to one or more allocation rules to define an allocated budget. There can be various allocation rules used, depending on the desired implementation. In one embodiment, the budget amount is allocated among the selected electronic publishers so that the allocated budget is within the maximum potential daily budget or total budget for each of the selected electronic publishers. The budget amount is allocated among the selected electronic publishers according to priorities assigned to those selected electronic publishers, in one embodiment. For instance, the priorities can be assigned according to lowest cost lead generator values associated with the selected electronic publishers.

In one embodiment, in Step 975, for each publisher, geography, and category, the maximum potential daily budget is calculated by multiplying a total daily click or impression inventory by an average cost per click or impression for each publisher/category/geography. This generally sets the boundaries for the maximum budget that can be used for each publisher/category/geography. For instance, for $100 campaign intervals, the optimal allocation percentage can be calculated by allocating clicks or impressions across each of the lowest cost lead generator publishers for that category/geography. By "lowest cost lead generators," this generally means that if publisher A can generate a lead for $5 and publisher B for $6, 100 percent of the budget amount within that campaign interval will go to publisher A, up to any publisher maximums determined for the particular implementation. This allocation can be made for every budget range to come up with the ideal allocation. In one embodiment, the campaign allocation engine 210 provides a premium for publisher diversity that reduces or eliminates the possibility of being dependent on only one publisher.

Again, the publisher allocation can be made for each designated publisher, geography, category, and campaign budget range or range of campaign objectives.

In Step 980, the calculated budget allocation of Step 975 is then applied to the marketing campaign. In one embodiment, this application includes weighting the allocation across a plurality of geographies. For instance, the allocation can be based on the relative populations of designated geographic regions, with more populated geographies getting a higher percentage of the budget. In another embodiment, the allocation also takes into account demographics and/or psychographics associated with those geographic areas.

In Step 985 of FIG. 9B, the allocated budget can be reallocated when the allocated budget is not within the minimum spend amount and maximum spend amount parameters, or where the publishers selected do not achieve the desired campaign objectives as set for the advertiser, as described above. Often, this will involve removing one or more electronic publishers and reallocating the allocated budget among the remaining electronic publishers according to reallocation rules. Generally, these reallocation rules will include one or more of the allocation rules described above.

In FIGS. 2A and 2B, an optimization engine 215 works in conjunction with campaign allocation engine 210 to optimize the allocated budget or reallocated budget. This often includes updating the allocation rules, depending on observed data from marketing campaigns. The observed data often includes campaign event information gathered by reporting engine 220, as described below. The campaign event information generally includes information describing campaign events such as impressions, clicks, emails, phone calls, links to HTML pages, coupon selection, coupon redemption, sales, and store visits. The optimization engine 215 generally attempts to determine a budget allocation that drives the most high valued campaign events for the least cost. In each particular marketing campaign, the campaign events generated will depend on the particular publishers and subject matter of the advertisement. For instance, some advertisements may generate more phone calls, and other advertisers may generate more visits to web pages. Depending on the nature of the advertiser's business, phone calls or web site visits may result in higher sales, all of which information can be used to further optimize the campaign allocation.

Figure 11:
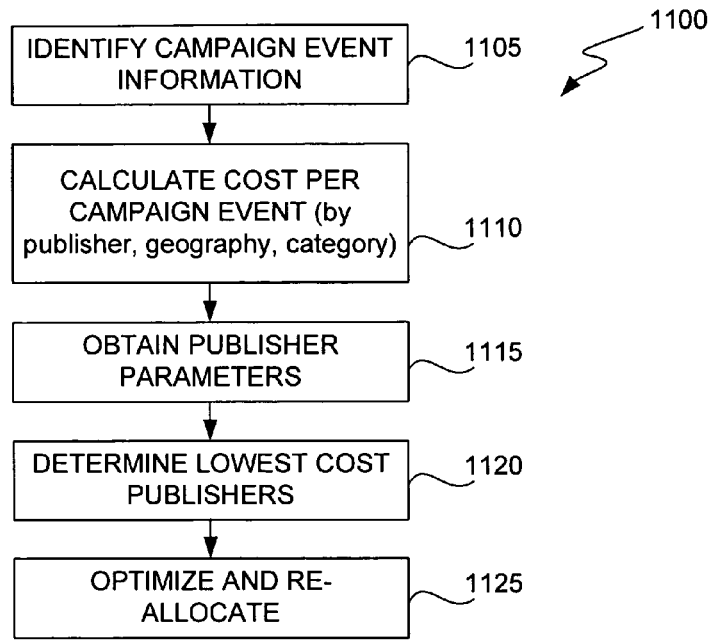
FIG. 11 shows a method 1100 for optimizing a budget allocation, performed in accordance with one embodiment of the present invention.

FIG. 11 shows a method 1100 for optimizing a budget allocation performed by optimization engine 215 according to one embodiment of the present invention. In step 1105, campaign event information, as described above, is identified. In step 1110, optimization engine 215 calculates a cost per campaign event, by publisher, geography and category. Then, in step 1115, publisher parameters are obtained, such as average cost per click, number of available clicks, and number of competing advertisers. In step 1120, the lowest cost publishers are determined based on the campaign event information identified in step 1105 and the calculated cost per campaign event from step 1110. Then, in step 1125, the allocation rules are optimized and the budget is re-allocated, as described herein.

There are several types of "campaign events," or "events" that are monitored using embodiments of methods and apparatus of the present invention. Such events are used to optimize campaign allocation and bidding methods, as described above, and are used as part of a reporting procedure described below. These events can also be used to trigger alarms if the marketing campaign is not achieving its expected results, resulting in an adjustment of budget allocations or other adjustments. The events addressed include impressions, referring to the number of times an advertisement has been displayed by a publisher, and advertisement interactions such as clicks, referring to the number of times an ad has been clicked by users. Campaign events also include lead information such as phone calls, emails, links to an advertiser web site or offer page, clicks on the advertiser web page or web site, and coupon selection and redemption. Often, lead information will include contact information received from a customer, IP addresses, and other information identifying customers. Campaign events also include purchase information and sales information generated, for instance, during an e-commerce transaction. Examples of campaign event information include phone calls made using tracking numbers, as described below, emails sent using tracking emails, also described below. In some embodiments, searches on an advertiser's site are also monitored as campaign events.

"Ad type" refers to the nature of the advertisement used in the marketing campaign. Several advertisements can be used, including keywords, paid inclusions, referring to any advertiser whose site is submitted for listing on major search engines that offer paid inclusion, and generic and customized banners. Other ad types include directory listings and other sponsored listings.

Tracking phone numbers are provided with embodiments of methods and apparatus of the present invention. Using these numbers, the source of a lead can be identified, or, at the very least, a counter can accumulate contacts to the tracking number. One or more tracking numbers can be procured for an advertiser, depending on the desired implementation. The tracking numbers are generally used to keep track of the number of calls made to that number. In one embodiment, a tracking number table maintained by advertising platform apparatus 120 includes the following fields: advertiser ID, campaign ID, target phone number, tracking phone number, tracking phone number type, e.g., local or toll-free, publisher ID, Geo ID and, in some instances, the keyword used.

When a marketing campaign has been undertaken, and if the advertiser has an email address, the advertising platform 120 can replace that email address with a tracking email. In this embodiment, the tracking email can be obtained for the advertiser. A table is maintained as described above for tracking emails used by various advertisers. In one embodiment, fields in the table include advertiser ID, campaign ID, target email address, tracking email address, publisher ID, Geo ID and, in some instances, the keyword used.

Methods and apparatus performed in accordance with embodiments of the present invention include a reporting feature. After a marketing campaign has begun, campaign activity is reported to the advertiser. A centralized reporting engine 220, as shown in FIGS. 2A and 2B, is able to track and monitor customer activity pertaining to the marketing campaign for that advertiser. The report delivered by reporting engine 220 can be customized as desired by the advertiser. Generally, reporting engine 220 provides tracking of campaign events related to the marketing campaign, including: emails, phone calls, coupons, visits to web pages, web forms filled out and submitted, and other events described above.

Figure 12:
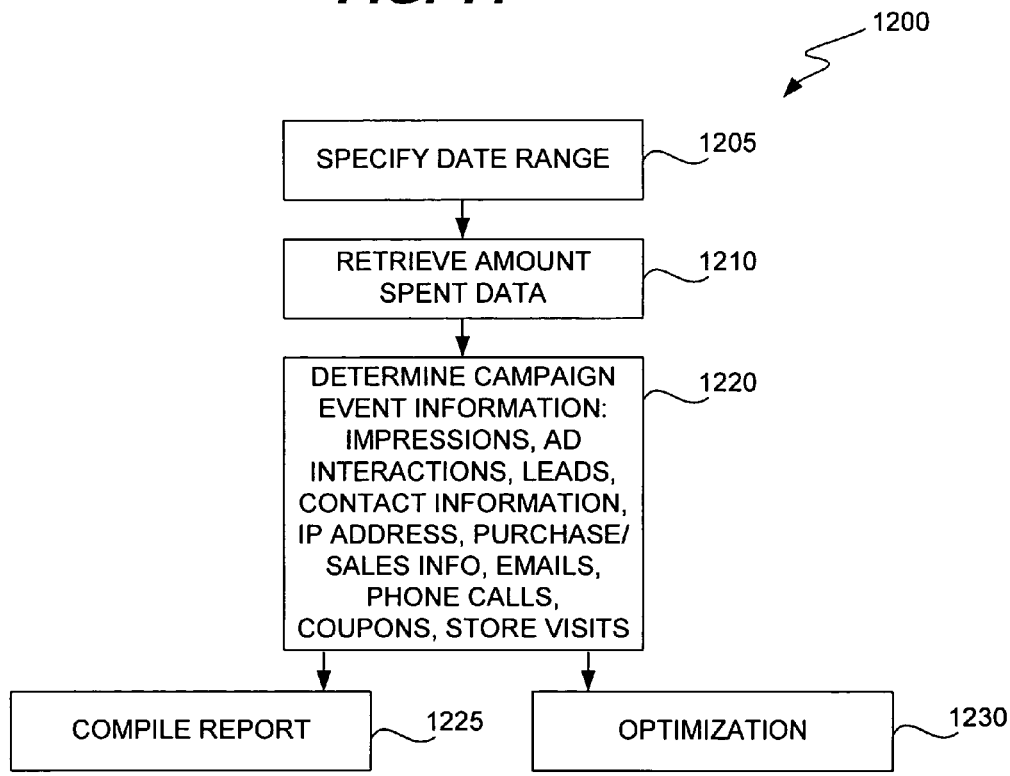
FIG. 12 shows a method 1200 of tracking customer interactions, performed in accordance with one embodiment of the present invention.

FIG. 12 shows a method of tracking and reporting customer activity, performed by reporting engine 220 in accordance with one embodiment of the present invention. In Step 1205, a date range is specified for the report. The advertiser can specify a "from" date and "to" date for the range. This specification can be made by the advertiser when setting up the campaign in step 310 of FIG. 3, or at any later time during the campaign. In an alternative embodiment, the date range is controlled by the online advertising platform.

In Step 1210 of FIG. 12, data describing the campaign status is retrieved for delivery to the advertiser. In one embodiment, this data includes an amount spent number. The amount spent is preferably provided in the form of a total amount spent across all of the publishers, and also shows the amount spent for each publisher. The amount spent for each publisher will generally be the sum of any up front fees plus any per click charges multiplied by the number of clicks, a number provided by the publisher. For some publishers, the actual per click amount will be specified in reports from those publishers. For other publishers, the per click amounts are determined prior to the campaign and are retrieved from memory.

In Step 1215 of FIG. 12, campaign event information is determined. Part or all of the campaign event information is tracked and monitored using reporting engine 220. Examples of campaign events are described above. In some embodiments, a portion of the determined campaign event information, such as advertisement interactions, are received from the publishers. In Step 1225, after all of the data in Steps 1205-1220 is gathered, the data can be assembled into a report for the advertiser. This report, in one embodiment, outputs all of the retrieved data in a table format for the advertiser. The report can be sent to the advertiser in email form or in another suitable form such as a printed mailing. In another embodiment the advertiser can access a server on which the advertising platform apparatus 120 is situated, and download the report. Reports can be provided to the advertiser as desired, e.g., on a daily, weekly or monthly basis.

In one embodiment, when the report is sent by email, an advertiser can click on certain figures presented in the report, and the advertiser is linked to an HTML page including more detailed information for that figure. For instance, when the advertiser clicks on the phone calls figure, a popup window can provide further call details, including the number of calls received per individual publisher and other information such as caller ID, time of the call, call duration, and other information. Similar further details of email leads can be provided including date, time and email address of the interested customer.

Coupon information including the number of clicks for a specific campaign offer, total number of prints, and registration of coupon offers can also be provided.

In step 1230, the data gathered by reporting engine 220 can also be used to optimize allocation rules used by campaign allocation engine 210. Such updating can be performed at various times using multiple marketing campaigns performed on behalf of different advertisers to update the allocation rules for current and future marketing campaigns.

In FIG. 2, the advertising platform apparatus 120 further includes a reverse proxy engine 225. The reverse proxy engine 225 performs a method of dynamically rendering an advertiser web page associated with the advertiser, as shown in FIG. 15A, as a proxied web page, as shown in FIG. 15B. Through this proxied web page, customer interactions can be tracked. In one embodiment, shown in FIG. 14, the proxied web page is stored on a storage medium such as database 240 local to or easily accessible by advertising platform apparatus 120. The proxied web page can also be situated on a database 1415 controlled by an advertiser 1405, or at a central data storage facility 1420 accessible over data network 125. Generally, the proxied web page is a version of the advertiser's home page or other advertisement web page retrieved and dynamically edited in real time with certain information, such as contact information, pricing information, images, and other data in the advertiser web page strategically replaced. In one embodiment, an entire advertiser web site can be proxied, using essentially the same techniques for editing individual web pages, described herein.

Figure 13:
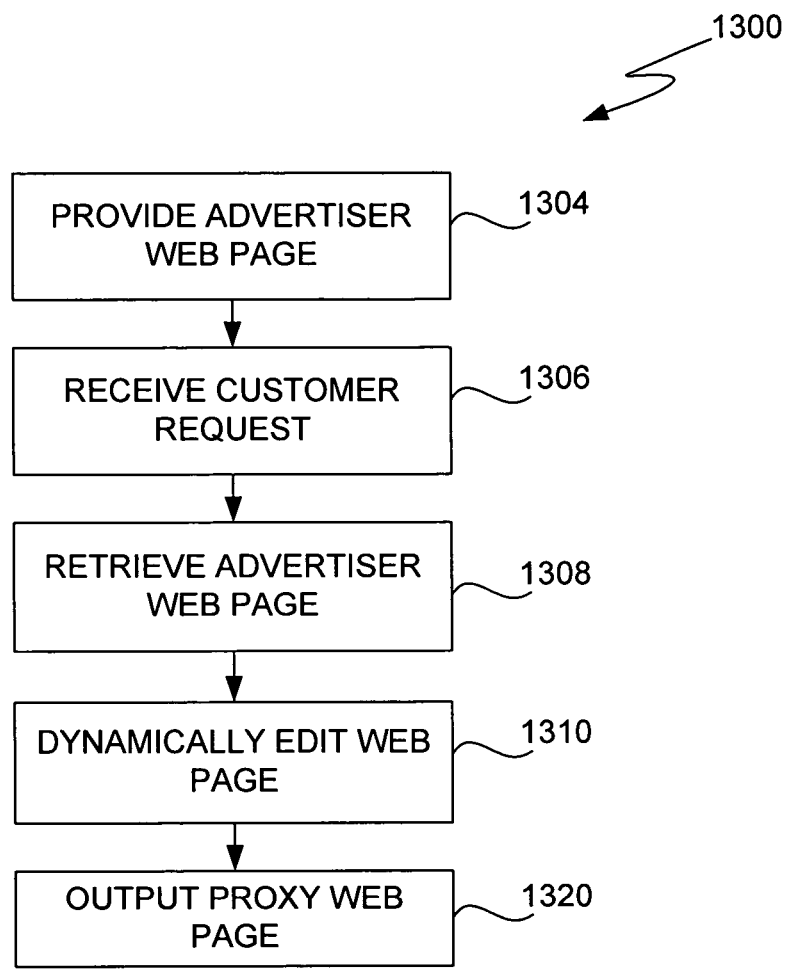
FIG. 13 shows a method 1300 of rendering a web page as a proxied web page, performed in accordance with one embodiment of the present invention.

FIG. 13 shows the method of rendering an advertiser web page as the proxied web page, performed in accordance with one embodiment of the present invention. The method 1300 of FIG. 13 is described with reference to FIGS. 14 and 15A, 15B. In Step 1304, the advertiser web page 1510 or web site is provided on an accessible storage medium, such as database 1415 as described above. In Step 1306, a customer request message from customer 1405 is received by reverse proxy engine 225 of advertising platform 120. In some examples, the customer request message is first received through an advertisement displayed on an electronic publisher 145, and routed to advertising platform 120. Responsive to the customer request, the advertiser web page 1510 is retrieved by advertising platform 120 from where it is ordinarily stored. In step 1310, the reverse proxy engine 225 dynamically edits the advertiser web page 1510 of FIG. 15A to create a proxied web page 1520, shown in FIG. 15B.

In one example, as shown in FIGS. 15A and 15B, the dynamic editing includes filtering the content of the advertiser web page 1510. For instance, contact information on that page can be identified using conventional pattern recognition techniques. Examples of such identified contact information include phone numbers, email addresses, images, and other numbers including fax numbers, cell phone numbers, and any other means for contacting the advertiser. The numbers on the advertiser web page are characterized herein as "target" numbers, referring to the actual number at which the advertiser can respond to a customer. The identified contact information is replaced with appropriate tracking numbers. These tracking numbers are intermediary numbers through which the customer interaction will be routed to gather information about the customer interaction. For instance, in FIG. 15B, the "phone" number "Contact: ReachLocal.com" number shown on advertiser web page 1510 of FIG. 15A have been replaced on the proxied web page 1520. The email address "sales@reachlocal.com" has been replaced with a tracking email link, "send E-Mail to Sales," which generates a tracking email. In other examples, the dynamic editing includes replacing a price on the advertiser web page. For instance, the price can be associated with an item in inventory that is displayed only to customers accessing the page via an advertisement from the marketing campaign. Another example of dynamic editing the advertiser web page is inserting or replacing electronic coupons.

In one embodiment, a data collection engine is triggered every time the tracking number shown on the proxied web page 1520 is used by customer 1405 and other customers. The data collection engine, in one embodiment, includes a counter which is incremented every time that number is used. In another embodiment, the data collection engine collects additional information from the customer, including the customer's email address, phone number, other customer identification information, date and time of the contact, and the duration of the contact. The data collection engine collects data for each item of contact information replaced, including phone numbers, email addresses, and other contact information as described above.

In Step 1310 of FIG. 13, email substitutions and phone number substitutions are made by simply replacing the identified contact information in the advertiser web page with tracking numbers in standard email and phone number formats. In certain instances, graphical images displayed on the advertiser web page may contain phone numbers and/or email addresses within. In these situations, an optical character recognition (OCR) operation is performed to identify those email addresses and phone numbers. Then the identified contact information can be replaced accordingly.

In one embodiment, the tracking numbers and data collection engine described herein can be obtained through third party providers.

Figure 14:
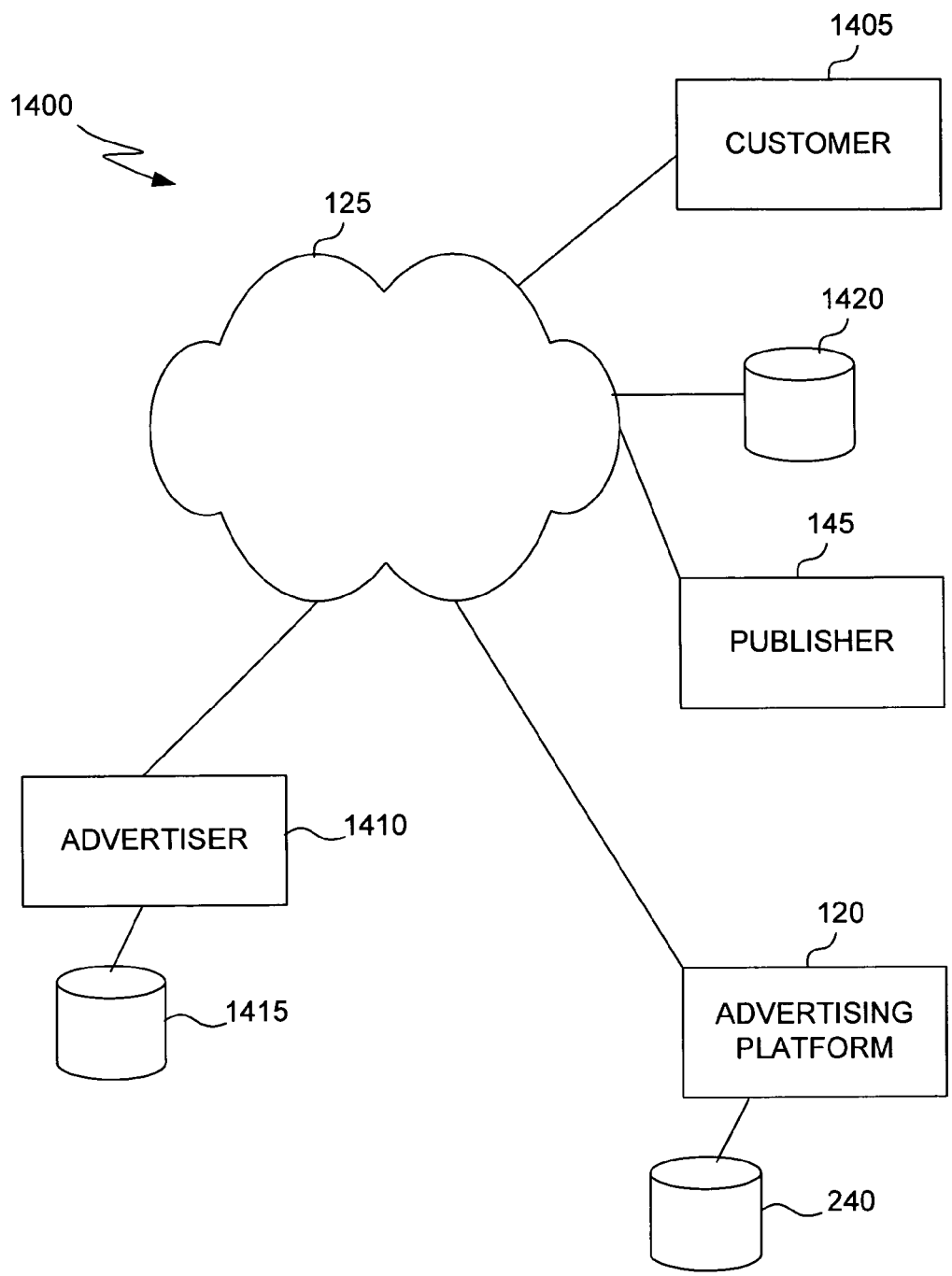
FIG. 14 shows an advertising system 1400, constructed according to one embodiment of the present invention.
Figure 15A:
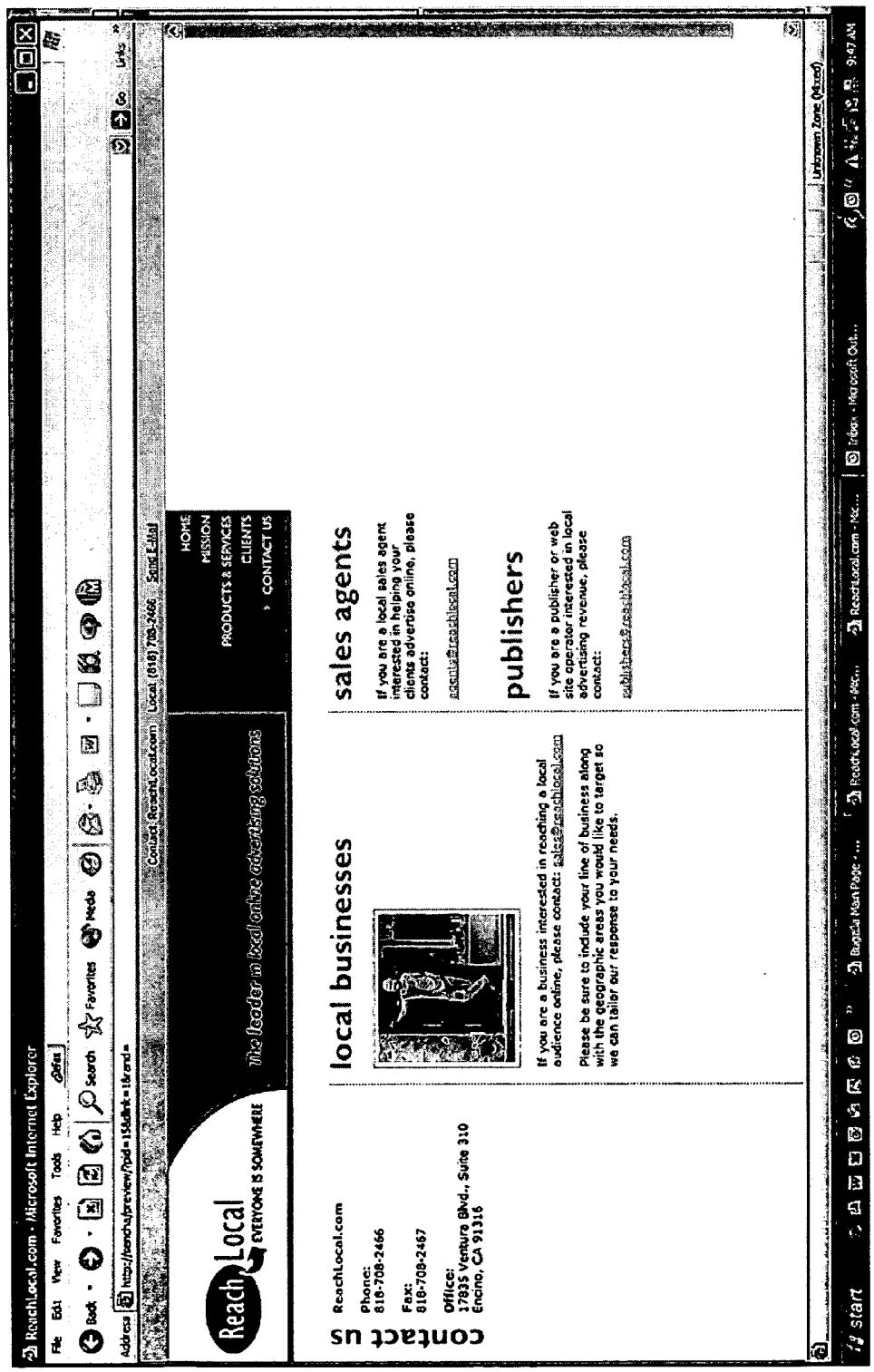
FIG. 15A shows an advertiser web page 1510, provided in accordance with one embodiment of the present invention.
Figure 15B:
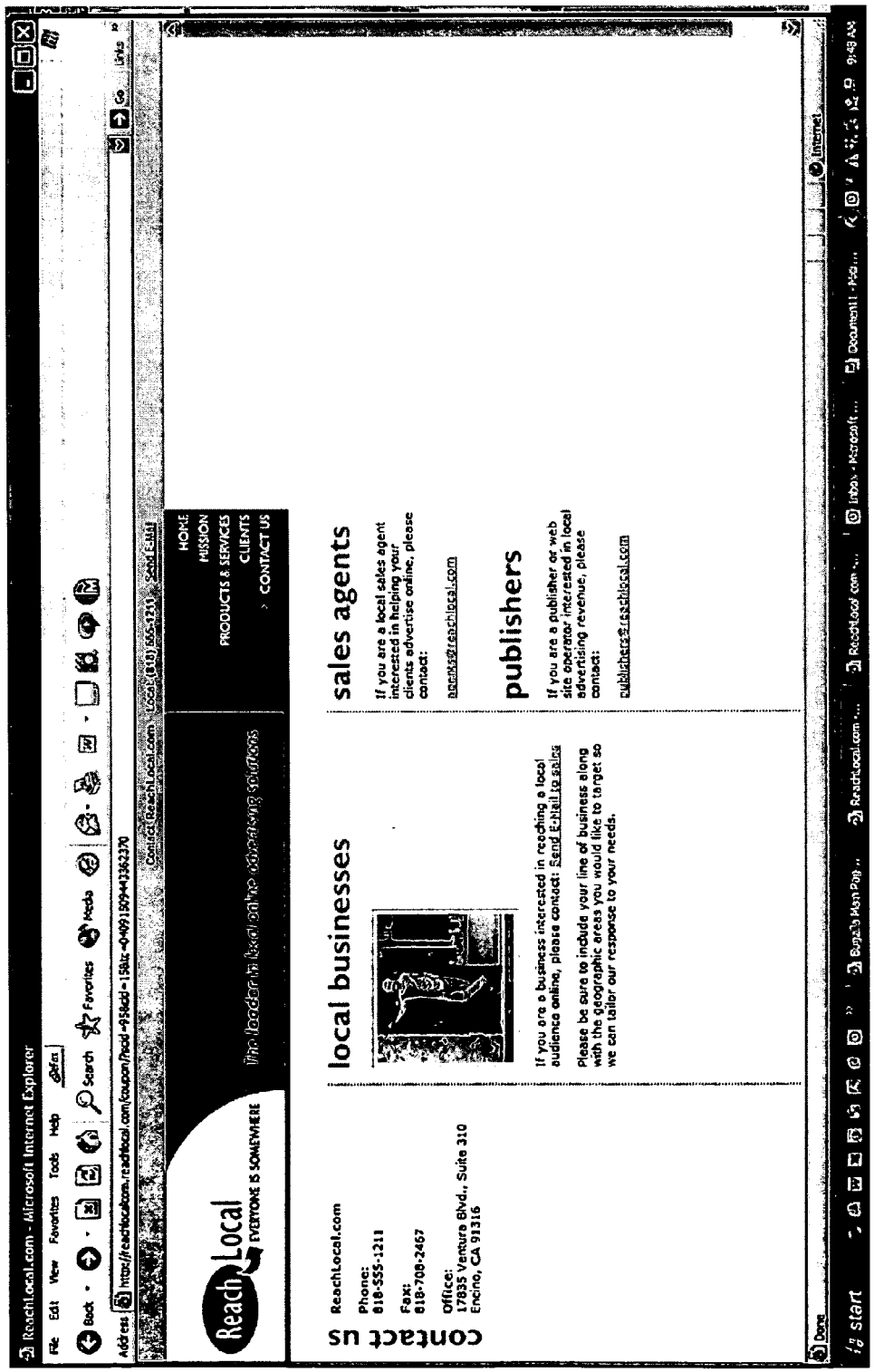
FIG. 15B shows a proxied web page 1520, provided in accordance with one embodiment of the present invention.

In Step 1320 of FIG. 13, the reverse proxy engine 225 of advertising platform 120 of FIG. 14 serves the proxied web page 1520 to a computer operated by customer 1405 over data network 125. In some implementations, the customer receives the proxied web page not knowing that the dynamic editing described above has taken place. The editing is seamless, and provides the benefit of gathering information for the advertiser without interfering with the customer's experience.

In one implementation, reverse proxy engine 225 provides links referencing the proxied web page to the various publishers, such as publisher 145 in FIG. 1, as part of the advertising information. In this way, when the advertiser attempts to access the advertiser's web page through those publishers, the advertiser is routed to the proxied web page. Then, not knowing the target contact information, the customer will contact the advertiser through the tracking numbers, enabling the counting and gathering of information regarding that interaction.

Embodiments of the invention, including the methods, apparatus, platform, engines and functions described herein, can be implemented in digital electronic circuitry, or in computer hardware, firmware, software, or in combinations of them. Apparatus embodiments of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. Embodiments of the invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other embodiments are within the scope of the following claims.

What is claimed is:

1. A method for generating advertisement information for performing a marketing campaign on behalf of an advertiser having an associated computer in communication with a data network using a plurality of electronic publishers in communication with the data network, the method comprising:

receiving at an advertising platform, which platform is configured to manage advertising for the yield benefit of an advertiser across multiple publishers, over the data network, information describing subject matter of the marketing campaign;

generating advertisement information based on the received information describing the marketing campaign subject matter managed by the advertising platform;

automatically, though a publisher interface engine of the advertising platform, without an advertiser having to learn the complexities of a plurality of publishers' advertising techniques or keyword bidding systems, or without an advertiser having to establish individual advertising accounts with a plurality of publishers, generating via the advertising platform a plurality of instantiations of the advertisement information, using publisher parameters associated with the electronic publishers, wherein at least two publisher parameters are distinct and specific to the publishers, each instantiation in a format appropriate for a respective one of the electronic publishers;

providing plural, different generated instantiations via a publisher interface engine to plural respective electronic publisher over the data network, including at least two of search publishers, display publishers and directory publishers; and at a reporting and optimization engine, using data received from two or more of publishers, proxy activity, consumer history, link tracking and phone call tracking to produce regular optimal refinement of selection of publishers, bids, keyword selection and prices and budget or other marketing activity for the yield benefit of the advertiser across the multiple publishers and publisher types to optimize leads.

2. The method of claim 1, wherein the electronic publishers include a search engine.

3. The method of claim 1, wherein the electronic publishers include an online directory.

4. The method of claim 1, wherein the electronic publishers include an online yellow pages.

5. The method of claim 1, wherein the electronic publishers include an online shopping service.

6. The method of claim 1, wherein the electronic publishers include an e-commerce provider.

7. The method of claim 1, wherein the advertisement information includes a textual advertisement.

8. The method of claim 1, wherein the advertisement information includes a graphical advertisement.

9. The method of claim 1, wherein the advertisement information includes an item for sale.

10. The method of claim 9, wherein the item for sale is a product.

11. The method of claim 1, wherein the at least one generated instantiation includes duration information.

12. The method of claim 1, wherein the at least one generated instantiation includes one or more categories describing subject matter of the marketing campaign.

13. The method of claim 12, wherein the at least one generated instantiation includes a publisher bid amount associated with at least one of the categories.

14. The method of claim 1, wherein the at least one generated instantiation includes one or more keywords for the marketing campaign.

15. The method of claim 14, wherein the at least one generated instantiation includes a publisher bid amount associated with at least one of the keywords.

16. The method of claim 1, wherein the at least one generated instantiation includes one or more geographic areas for targeting the marketing campaign.

17. The method of claim 1, wherein the at least one generated instantiation includes one or more demographics for targeting the marketing campaign.

18. The method of claim 1, wherein the at least one generated instantiation includes one or more psychographics for targeting the marketing campaign.

19. The method of claim 1, wherein the at least one generated instantiation includes a budget amount.

20. The method of claim 19, wherein the budget amount is a maximum spend amount.

21. The method of claim 19, wherein the budget amount is a fixed cost per lead amount.

22. The method of claim 19, wherein the budget amount is a maximum spend per lead amount.

23. The method of claim 1 further comprising the steps of:
providing a category-based data structure including data organized in a hierarchical structure of categories providing subject matter for characterizing the marketing campaign, the categories including:
an upper level category defining a level of the marketing campaign, and
a plurality of lower level categories organized hierarchically under the upper level category, the lower level categories further defining at least one lower level of the marketing campaign within the upper level category;
generating a user interface for display on the advertiser computer, the user interface configured to provide at least a portion of the categories of the data structure for selection on behalf of the advertiser; and receiving, through the user interface and over the data network, a selection of the upper level category for association with the advertiser, wherein:
the information describing the marketing campaign subject matter includes the selected upper level category.

24. The method of claim 23, further comprising the step of:
receiving, through the user interface and over the data network, a selection of at least one of the lower level categories for association with the advertiser, the information describing the marketing campaign subject matter further including the selected at least one lower level category.

25. The method of claim 23, wherein the upper level category describes the marketing campaign.

26. The method of claim 23, wherein the upper level category describes the advertiser.

27. The method of claim 24, wherein the selected at least one lower level category describes the marketing campaign.

28. The method of claim 24, wherein the selected at least one lower level category describes the advertiser.

29. The method of claim 24, wherein the selected at least one lower level category describes a specialty of the advertiser.

30. The method of claim 24, wherein the selected at least one lower level category describes a service provided by the advertiser.

31. The method of claim 24, wherein the selected at least one lower level category describes a product provided by the advertiser.

32. The method of claim 24, wherein the selected at least one lower level category describes an item in an inventory.

33. The method of claim 24, wherein the selected at least one lower level category describes a geographic territory for the marketing campaign.

34. The method of claim 23, wherein the upper level category designates a geographic territory for the marketing campaign.

35. The method of claim 34, wherein the lower level categories designate sub-geographic territories within the geographic territory.

36. The method of claim 23, wherein the upper level category designates a national territory.

37. The method of claim 23, wherein the upper level category designates a designated marketing area (DMA) territory.

38. The method of claim 23, wherein the upper level category designates a city territory.

39. The method of claim 23, wherein the lower level categories include a plurality of DMAs.

40. The method of claim 23, wherein the lower level categories include a plurality of cities.

41. The method of claim 23, wherein the lower level categories include a plurality of Sectional Center Facilities (SCF).

42. The method of claim 23, wherein the lower level categories include a plurality of zip codes.

43. The method of claim 1, further comprising the steps of:
providing a plurality of keywords, each keyword associated with at least one of a plurality of categories providing subject matter for characterizing the marketing campaign;
receiving a selection of at least one of the categories for association with the advertiser; wherein the information describing the marketing campaign subject matter includes the selected at least one category; and
wherein the step of generating advertisement information based on the received information describing the marketing campaign subject matter includes:
(i) retrieving the keyword or keywords associated with the selected at least one category, and
(ii) outputting the retrieved keyword or keywords.

44. The method of claim 43, wherein generating the advertisement information based on the received information describing the marketing campaign subject matter further includes:
(i) retrieving a value associated with the retrieved keyword or keywords, and
(ii) outputting the retrieved value with the retrieved keyword or keywords.

45. The method of claim 44, wherein the retrieved value is a publisher bid amount representing an amount to spend on the associated keyword at each electronic publisher.

46. The method of claim 43, wherein the outputted keyword or keywords represent search terms for the electronic publishers.

47. The method of claim 43 further comprising the step of:
generating a user interface for display on the advertiser computer, the user interface configured to provide at least a portion of the categories for selection on behalf of the advertiser; and
wherein the selection of the at least one category is received through the user interface and over the data network.

48. The method of claim 43, wherein retrieving the keyword or keywords includes:
accessing a keyword table;
providing a category identifier (ID);
identifying, in the keyword table, the keyword or keywords as associated with the category ID.

49. The method of claim 48, wherein retrieving the keyword or keywords further includes:
selecting the identified keyword or keywords based on values associated with the keywords.

50. The method of claim 1, further comprising the steps of:
providing a plurality of groups of keywords, each group of keywords associated with at least one of a plurality of categories providing subject matter for characterizing the marketing campaign;
generating a user interface for display on the advertiser computer, the user interface configured to provide at least a portion of the categories for selection on behalf of the advertiser; and
receiving, through the user interface and over the data network, a selection of at least one of the provided categories for association with the advertiser;
wherein the information describing the marketing campaign subject matter includes the selected at least one category; and
wherein generating advertisement information based on the received information describing the marketing campaign subject matter includes:
(i) retrieving the group or groups of keywords associated with the selected at least one category, and
(ii) outputting the retrieved group of groups of keywords.

51. The method of claim 50, wherein retrieving the group or groups of keywords includes:
accessing a keyword table;
providing a category identifier (ID);
identifying, in the keyword table, the group or groups of keywords as associated with the category ID.

52. The method of claim 51, wherein retrieving the group or groups of keywords further includes:
selecting the identified group or groups of keywords based on values associated with the keywords.

53. A computer program product, stored on a processor readable medium, comprising instructions operable to cause a data processing apparatus to perform a method for generating advertisement information for performing a marketing campaign on behalf of an advertiser having an associated computer in communication with a data network using a plurality of electronic publishers in communication with the data network, the method comprising the steps of:
receiving at an advertising platform, which platform is configured to manage advertising for the yield benefit of an advertiser across multiple publishers, over the data network, information describing subject matter of the marketing campaign;
generating advertisement information based on the received information describing the marketing campaign subject matter managed by the advertising platform;
automatically, without an advertiser having to learn the complexities of a plurality of publishers' advertising techniques or keyword bidding systems, or without an advertiser having to establish individual advertising accounts with a plurality of publishers, generating via the advertising platform a plurality of instantiations of the advertisement information, using publisher parameters associated with the electronic publishers, wherein at least two publisher parameters are distinct and specific to the publishers, each instantiation in a format appropriate for a respective one of the electronic publishers; and providing plural, different generated instantiations via a publisher interface engine to plural respective electronic publisher over the data network, including at least two of search publishers, display publishers and directory publishers; and at a reporting and optimization engine, using data received from two or more of publishers, proxy activity, consumer history, link tracking and phone call tracking to produce regular optimal refinement of selection of publishers, bids, keyword selection and prices and budget or other marketing activity for the yield benefit of the advertiser across the multiple publishers and publisher types to optimize leads.

54. The method of claim 1, wherein generating the plurality of instantiations of the advertisement information, using publisher parameters associated with the electronic publishers, each instantiation in the format appropriate for t respective one of the electronic publishers, includes:

mapping the advertisement information to publisher categories associated with the respective one electronic publisher.

\* \* \* \* \*